April 1, 1941. H. J. FURBER 2,236,794
MECHANISM FOR DIVISION
Original Filed Oct. 9, 1935 7 Sheets-Sheet 1
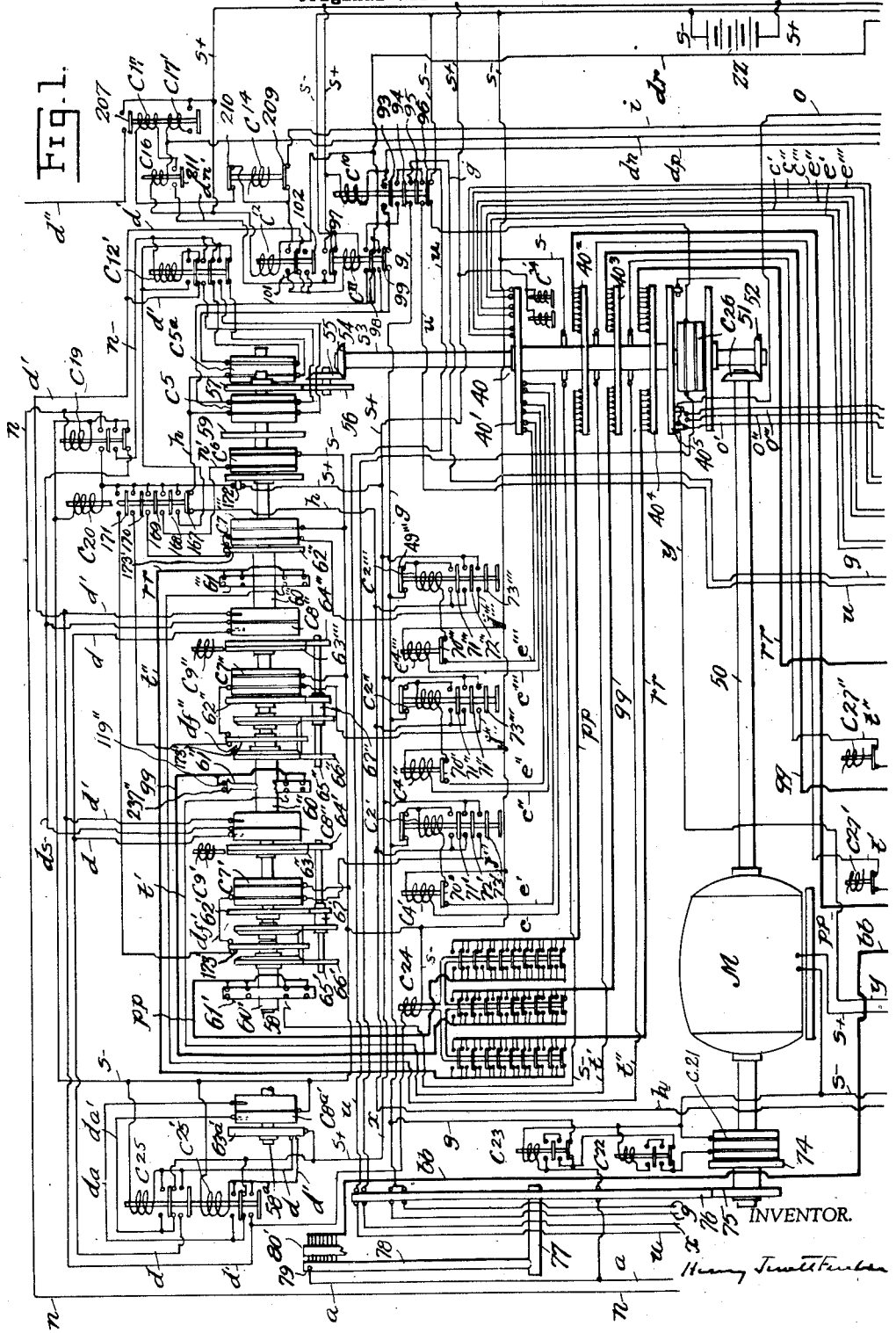

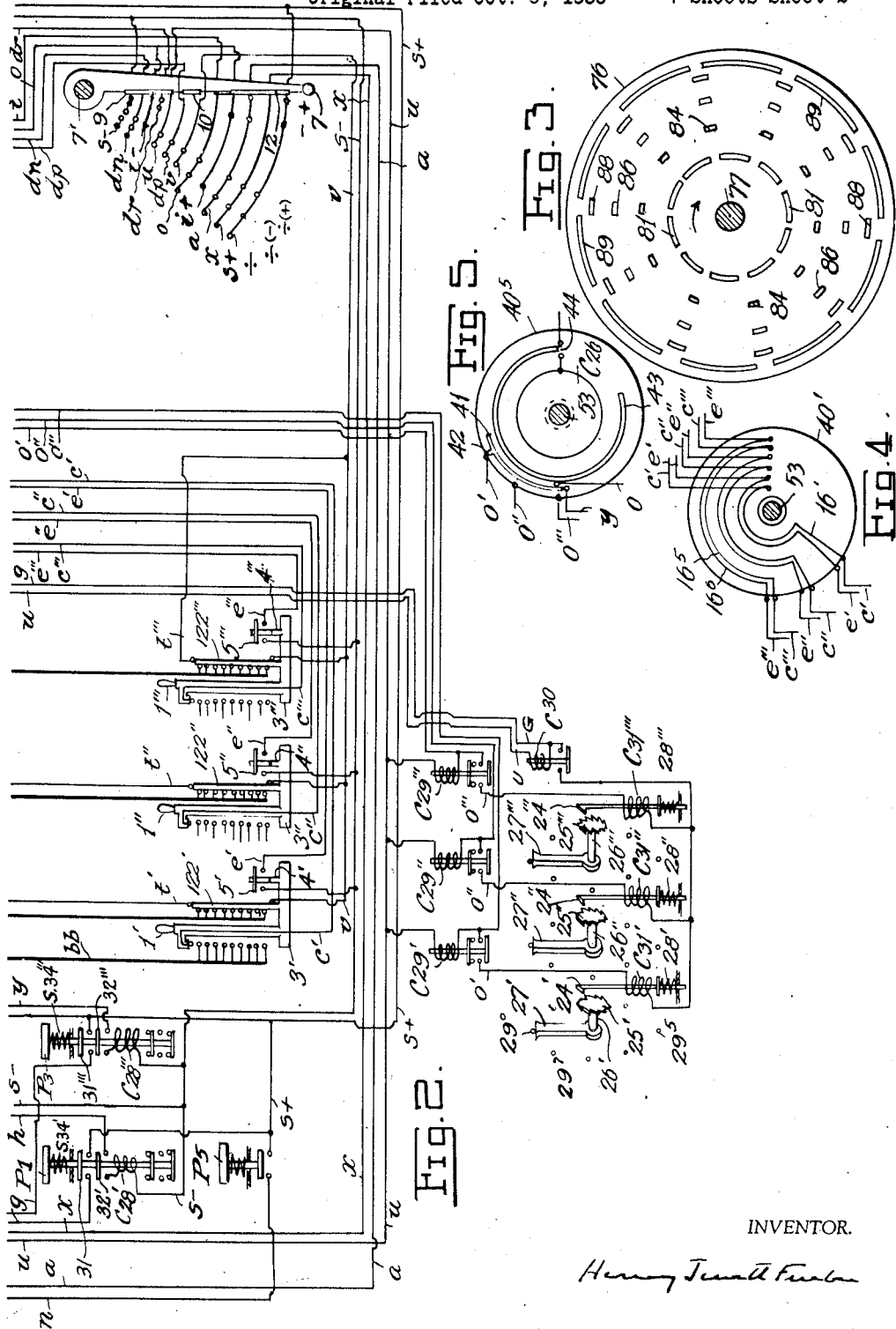

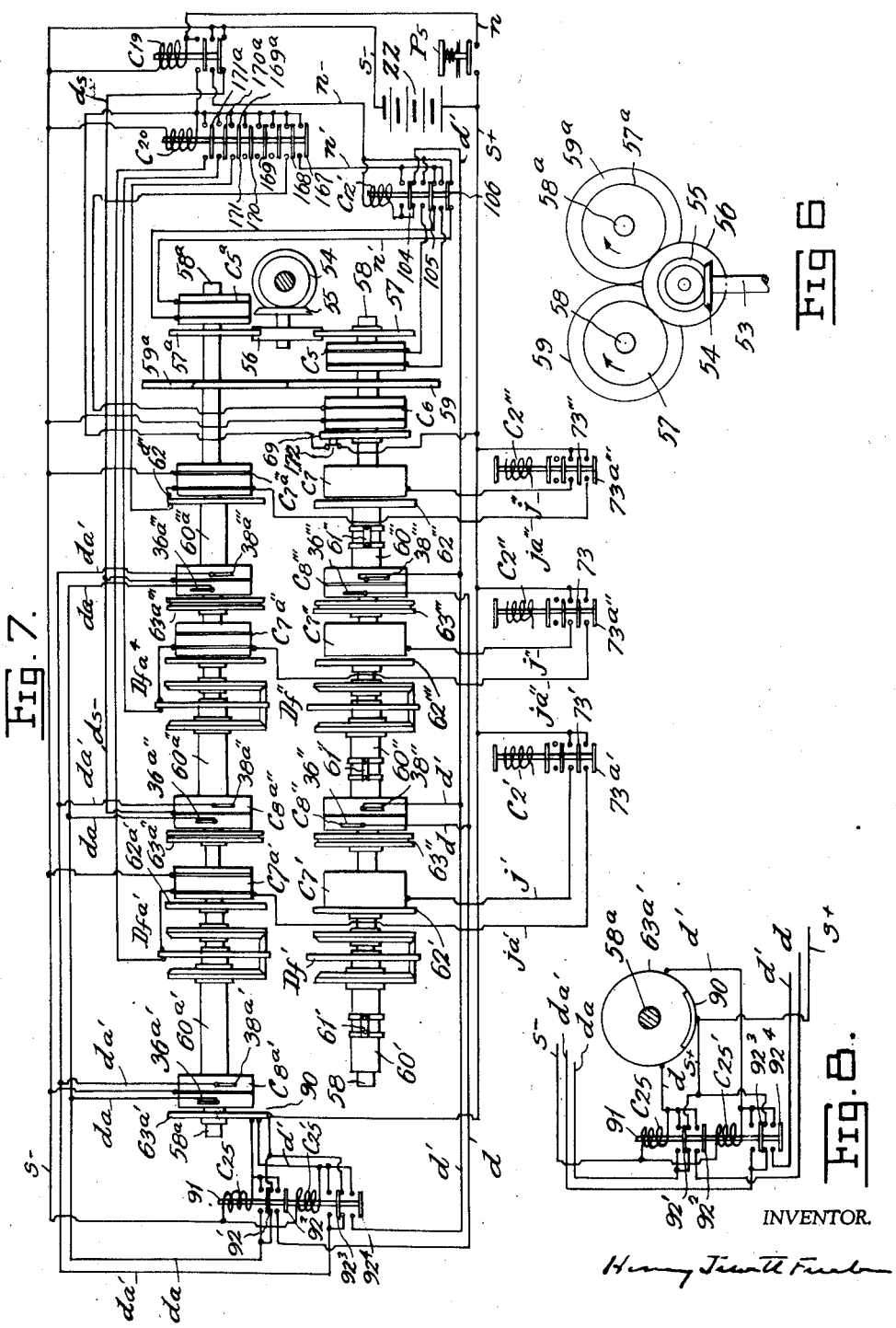

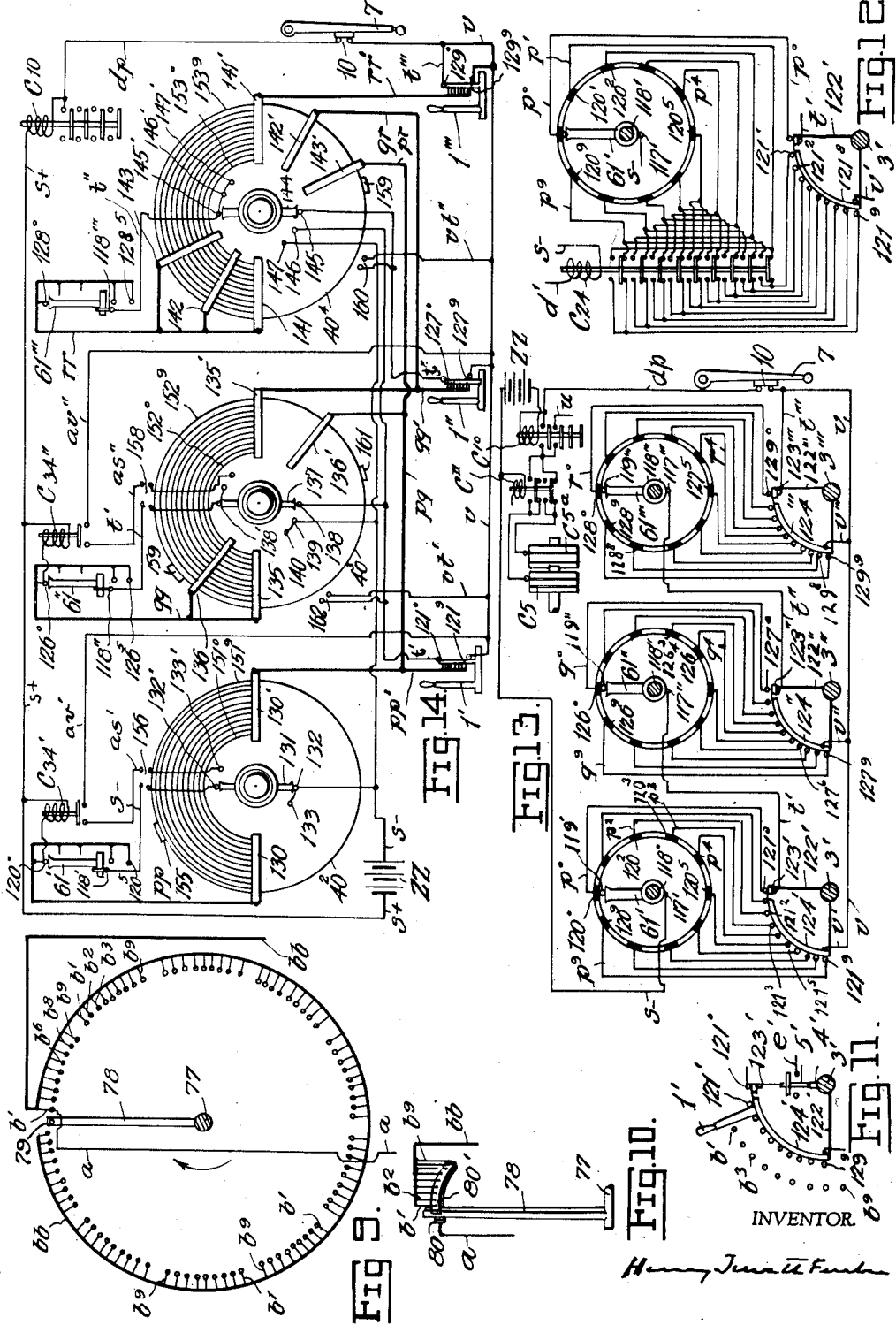

April 1, 1941.   H. J. FURBER   2,236,794
MECHANISM FOR DIVISION
Original Filed Oct. 9, 1935   7 Sheets-Sheet 5

INVENTOR.
Henry Jewell Furber

April 1, 1941.  H. J. FURBER  2,236,794
MECHANISM FOR DIVISION
Original Filed Oct. 9, 1935   7 Sheets-Sheet 7
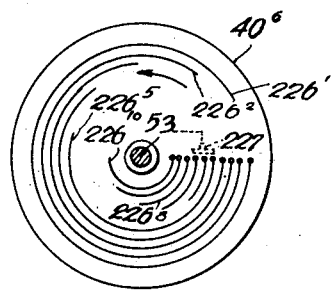
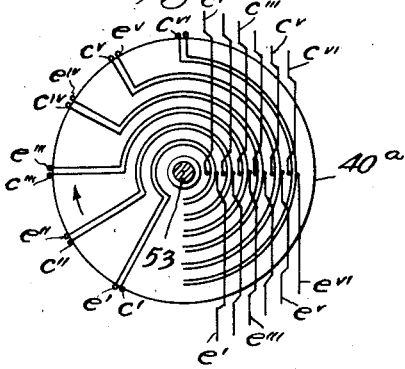
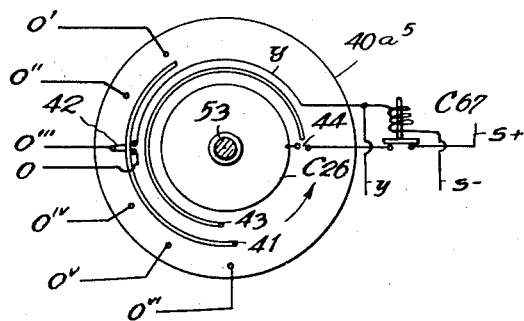

Patented Apr. 1, 1941

2,236,794

UNITED STATES PATENT OFFICE 2,236,794

MECHANISM FOR DIVISION

Henry Jewett Furber, Silver Spring, Md.

Original application October 9, 1935, Serial No. 44,159. Divided and this application July 28, 1937, Serial No. 156,198

9 Claims. (Cl. 235—60)

This invention relates to improvements in mechanism for division; and the present application is divisional of my copending application Serial No. 44,159, filed October 9, 1935, which is a continuation, in part, of application Serial No. 723,595, filed May 2, 1934.

An object of this invention is to provide means for developing a quotient, whether positive or negative, by means of an accumulator operative automatically in one respective direction or the other, accordingly as the dividend be positive or negative in quality; and automatically to distinguish the quality of the quotient.

Another object of this invention is to provide means for performing division by subtractive operation in the reduction of the dividend to zero or negligible remainder; and to distinguish the quotient as positive or negative accordingly as the factors be similar or dissimilar in quality, regardless of the direction of motion at the said accumulator.

Another object of this invention is to provide means quantitatively to compare values of the factors, whether similar or dissimilar in quality, and automatically to effect column shift to lower orders, without overdraft, when the remainder at any certain columns becomes indivisible by the divisor.

The numbering and lettering of my copending application Serial No. 44,159, except the serial numbers of the figures, are preserved herein. Sufficient of the mechanism therein disclosed, is reproduced in the present application, to illustrate the operation of division, although not necessarily confined thereto.

With foregoing and other objects in view, as may appear, the invention now will be described in connection with the accompanying figures, in which details superfluous to division are, with view to clearness, in so far as possible suppressed.

Figure 1 is a general diagrammatic view of the calculating unit adapted to division.

Figure 2 is a diagrammatic view of the manual controls at which the factors are established, and state-control means which selectively conditions the calculating unit for positive or negative computation.

Figure 3 is a diagrammatic view from the right of the disk 76 shown in Figure 1, with various electric conductors which pass from face to face.

Figure 4 is a diagrammatic view of the disk 40' at the transmitter 40 shown in Figure 1.

Figure 5 is a view of the lower face of the disk 40⁵ at the transmitter 40.

Figure 6 is a diagrammatic view from the right of members shown in Figure 1, which transmit motion from shaft 53 to the shafts 58 and 58a.

Figure 7 is a diagrammatic plan view of the shafts 58, 58a, noted in Figure 6 with members and electrical connections appertinent thereto.

Figure 8 is a detail view from the left of the armature 63a' shown in Figure 7, with electrical connections.

Figure 9 is a diagrammatic view from the right of a timing arm 78 shown in Figure 1, with terminals corresponding to numerals at which circuits may be closed.

Figure 10 is a perspective view from the right, showing the pathway of the arm 78 in closing circuits between typical complementary contacts.

Figure 11 is a side view from the right of a typical sector 122' fixed on the shaft 3' with the lever 1' shown in Figure 2, which is operative in comparing the value of divisor with dividend and with remainders.

Figure 12 is a diagrammatic view from the right of the sector 122' shown in Figure 11, together with the multiple electric switch C.24 shown in Figure 1.

Figure 13 is a diagrammatic wiring plan showing in three progressive plans at right angles to the shaft 58, the accumulator arms 61', 61'', 61''', together with electrical connections which serve as a comparator to determine when, in operations of division, dividend and remainders are less than the divisor.

Figure 14 is a diagrammatic view of the disks 40², 40³, 40⁴, shown in Figure 1 with electrical connections.

Figure 15:
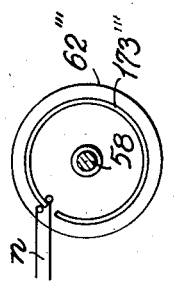

Figure 15 is a side view from the left of the armature 62''' shown in Figure 1, operative in restoring an accumulator arm to zero position.

Figure 16:
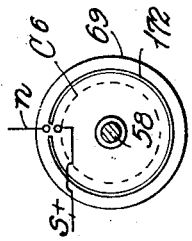

Figure 16 is a diagrammatic view from the left of the armature 69 shown in Figures 1 and 7 operative in clearing calculating unit.

Figure 17:
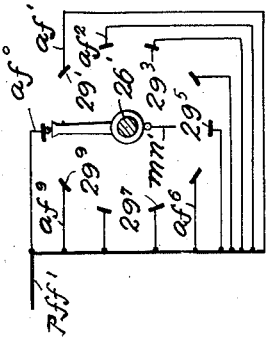

Figure 17 is a diagrammatic view of a typical quotient arm 27' with contacts to close numeral circuits which select the numerals of the quotient.

Figure 18:
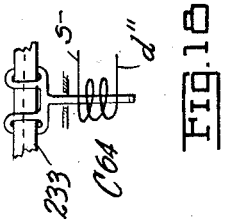

Figure 18 is a detail view of inking ribbon for indicating positive and negative resultants in different colors, with solenoid to shift position.

Figure 19:
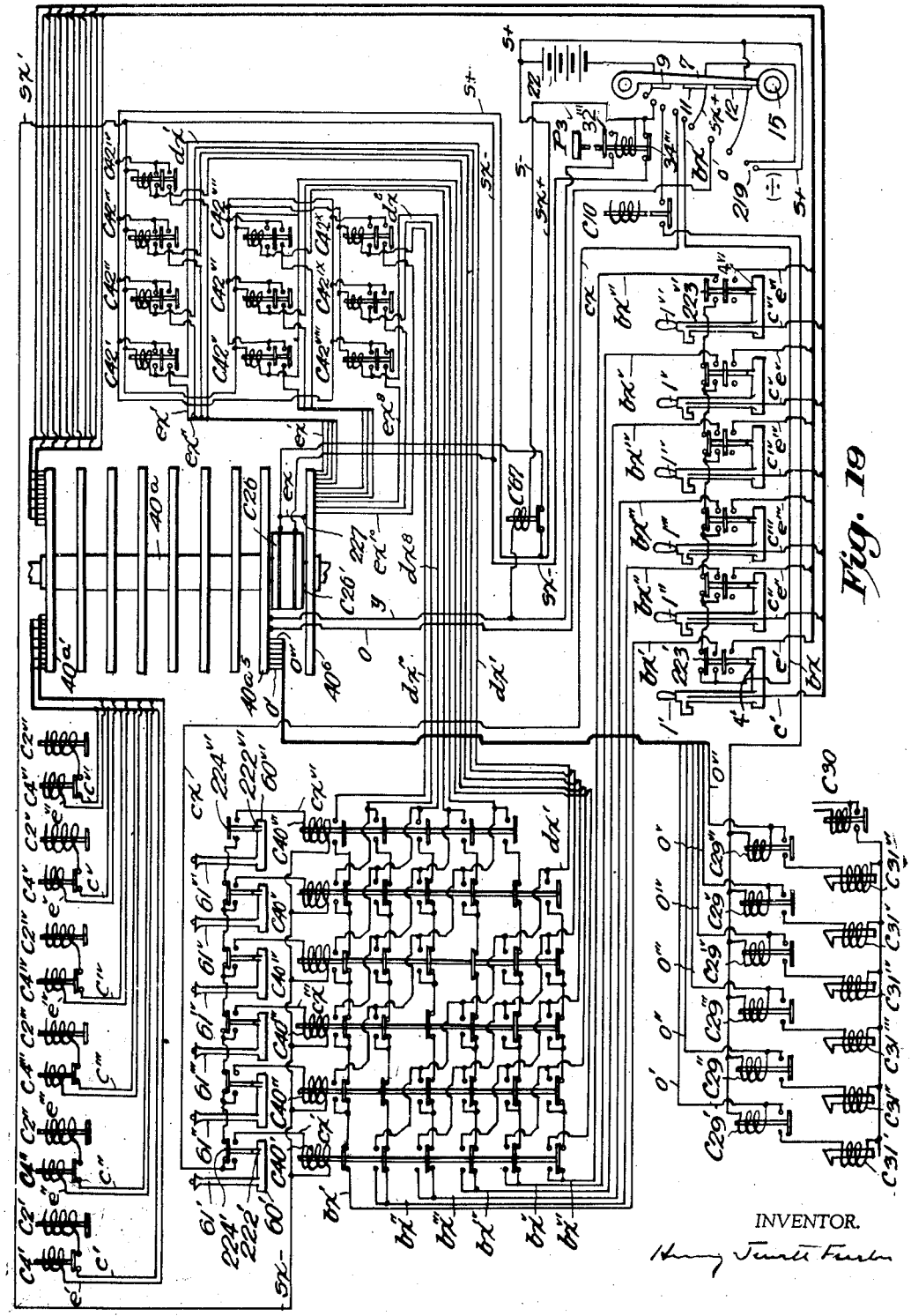

Figure 19 is a view of mechanism for effecting column-shift.

Figure 20 is a view of the lower face of disk 40⁶ adapted to six denominational accumulator orders for controlling amplitude of column-shift.

Figure 21 is a plan view of a typical disk 40ᵃ adapted to six denominational accumulator orders, for relaying actuating and immobilizing circuits in column-shift.

Figure 22 is a view of the lower face of the disk 40ª⁵ with circuits selectively to close circuits to quotient members denominationally corresponding to six orders.

All wheels disclosed in the above figures are toothed throughout, there being no mutilated gearings. The wires leading from the positive and negative poles of the source ZZ are designated respectively as wires s+ and s−. Cables carrying a plurality of wires are indicated by heavy lines. Bridges or switches at which the circuits carried by cables are shown as closed or broken, are multiple conductors which close separately the circuits of the several wires, being similar in principle to the switch S, shown in Figure 15, Furber 2,083,947. The direction of motion or transmission at rotary members, is indicated by arrows.

The term "accumulator" is employed to designate collectively the members 61', 61'', 61'''' (Figure 1) and 61' to 61ᵛⁱ (Figure 19), said members individually being termed "accumulator arms", as shown in Figures 1, 9, 13, 19 the accumulator arms 61', 61''' being concealed by contact benches in Figure 1.

*General description*

The dividend may be transmitted to the calculating unit (Figure 1) by means of electric circuits controlled by manual levers 1', 1'', 1''' (Figure 2), or by equivalent devices. A master switch 7 (Figure 2) is a state control which determines the nature of the operation which shall be performed. The depression of the push button P.I, (Figure 2) causes motion to be transmitted from an electric motor, M. (Figure 1), preferably in constant operation and revolving always in the same direction, to the accumulator arms 61', 61'', 61''', which are elements, respectively in progressive denominational orders of the apparatus and correspond to hundreds, tens and units. Motion is likewise communicated to a progressively movable switch or timing arm 78 (Figures 1, 9) which measures the movement of the accumulator arms 61', 61'', 61''', and arrests such members at angles of displacement corresponding to quantities selected at the manual controls.

The relays C.11, C.12 (Figure 1) control the direction of motion communicated to the accumulator arms 61', 61'', 61''' from the motor M. consistently with the positive or negative quality of the quantity transmitted.

The wheel 76 (Figures 1, 3) closes and breaks, through conductors which it carries, circuits established at the master switch 7 (Figure 2) or closed at the push buttons P.I, P.3, in such selective order, as to bring the members thereby affected, into operation in their proper turn.

Said push-buttons are introduced, in order that the calculating unit be brought into operation, only after all other controls are properly adjusted.

Referring to Figure 1, the motor M connected with the source ZZ through the wires s+, s−, imparts motion through the shaft 50, wheels 51, 52, shaft 53, wheels 54, 55, 56 (Figures 1, 6), armature 57 and the electric clutch C.5 to the shaft 58, on which are mounted the sleeves 60', 60'', 60''', carrying respectively the differentially operated accumulator arms 61', 61'', 61'''.

Motion is selectively transmitted to the sleeves 60', 60'', 60''', on which are fixed the accumulator arms 61', 61'', 61'''' (Figure 1) by electric clutches C.7', C.7'', C.7''' are fixed to the shaft 58, and operate respectively on the armature 62', 62'', 62'''. The sleeves 60', 60'', 60''' are carried by the shaft 58. The armature 62''' is integral with the sleeve 60'''. The armature 62'' transmits motion to the sleeve 60'', through the composite idler 67'' floating on the pivot 65'' and thence through the differential gearing Df'', the middle member of which is integral with the sleeve 60''. The armature 62' imparts motion to the sleeve 60', in similar manner, through the transmission 67' and the differential gearing df'. The differentials df', df'', are introduced, in order that the accumulator arms 61', 61'' may be responsive, each to quantities originating in its own corresponding denominational order, while simultaneously absorbing the carry-over from orders therebelow.

Positioning pins C.9'', C.9''', well known to the art, are indicated in Figure 1, their purpose being to correct overdraft, and to block a lateral member of a planetary gearing when the other lateral member be alone in operation. Such positioning pins may be employed where needed.

The orbits of the accumulator arms 61', 61'', 61''' are each divided into ten unitary steps of 36° corresponding to the numerals 0–9 (Figure 13).

Fixed on the motor shaft 50 is the electric clutch C.21, which, when energized, transmits motion through the armature 74 floating in solidarity with the pinion 75 on the motor shaft 50, to the wheel 76, fixed on the shaft 77 together with the timing arm 78 (Figures 1, 9). The timing arm 78 synchronizes in movement with the accumulator arms 61', 61'', 61''', moving, for example, through an arc of 3.6°, while an accumulator arm 61', 61'', 61''' moves through an arc of 36°. It is the function of the timing arm 78 to close circuits, as it advances, which selectively arrest the accumulator arms 61', 61'', 61''', at angles of displacement corresponding to the quantities established at the manual controls shown in Figure 2 as will hereinafter be described.

The manual controls include a series of levers, 1', 1'', 1''' (Figure 2) corresponding respectively to the descending orders, hundreds, tens and units, of the accumulator. Further controls comprise the master-switch 7 (Figure 2), the position of which regulates the electric circuits variously active in different operations. It is shown in Figure 2 with circuits limited to those employed in setting up the dividend and in the subtractive operations of subsequent division; and is adjustable to positions, presently described.

Fixed together with the levers 1', 1'', 1''', respectively, (Figure 2) on the axles 3', 3'', 3''', are the cams 4', 4'', 4''', which in normal position support the bridges 5', 5'', 5'''. Deflection of the levers 1', 1'', 1''' displaces the cams 4', 4'', 4''', releasing, respectively the bridges 5', 5'', 5''', which, falling through gravity, close circuits over the wires e', e'', e''', (Figures 2 and 1) to the electric relays C.2', C.2'', C.2'''. These circuits parallel each the others, the relays C.2', C.2'', C.2''' provoking, respectively, movement of the accumulator arms 61', 61'', 61''', by motor M. as presently described.

The circuit closed at the bridge 5''' (Figure 1) for example, when the lever 1''' is deflected, originates at the source ZZ and passes through the wire s−, the bridge 5''', the wire e''' over the conductor 16⁶ at the disk 40' (Figures 1, 4), presently described, and over the bridge 70''' at the relay C.4''''' (Figure 1) to the negative pole of the relay C.2''''. Circuit to the positive pole of the relay C.2'''' is momentarily completed at the bridge 49'''' through the wire g, connected with the source ZZ (Figure 1) through the wire s+ when, for example, the push-button P.1, (Figure 2), is depressed. The relay C.2'''' (Figure 1) is then held in stick, by circuit extending from its positive pole, over the bridges 71'''', 72'''', carried by the relay C.2'''' and the wire s+, back to the source ZZ. From the bridge 72'''', so closed at the relay C.2'''' circuit through the wire h extends over the bridge 167 at the relay C.20, shown with parts broken away in Figure 1, and in entirety in Figure 7, to the positive poles of the clutches C.5, C.5a, circuit to the negative poles of which may be selectively controlled by the master switch 7 (Figure 2). In the accumulation of a positive dividend, the master-switch 7 is placed in position +, closing circuit to the negative pole of the clutch C.5 (Figure 1), which transmits motion in clockwise direction to the accumulator arms 61', 61'', 61'''. In the accumulation of a negative dividend, the master-switch is placed in position, closing circuit to the negative pole of the clutch C.5a; and the movement of the accumulator arms 61', 61'', 61''' is reversed. The clutch C.5a (Figures 1, 7) is fixed on the shaft 58a. The armature 57a of the clutch C.5a floats on the shaft 58a. The armature 57 of the clutch C.5, floats on the shaft 58. The wheel 56 meshes with the armatures both 57 and 57a (Figure 6). Fixed respectively to the shafts 58, 58a, are the wheels 59, 59a (Figures 3, 7) in mesh one with the other, to the effect that when the clutch C.5 is energized and the shaft 58 is rotated by the motor in clockwise direction, the shaft 58a is rotated in direction opposite thereto; and when the clutch C.5a is energized, and the shaft 58a is rotated in clockwise direction, the shaft 58 is rotated in direction opposite to clockwise. The shaft 58a carries transmission largely similar to that carried by the shaft 58; and is provided with an additional clutch C.8a' shown in Figure 7 and with broken shaft in Figure 1, which operates as presently described.

When energized, the clutch C.5 (Figures 1, 7), in accumulation of a positive dividend, clutches the armature 57 constantly revolving, and receives motion in clockwise direction, which it imparts to the shaft 58, on which are fixed the electric clutches C.7''', C.7'', C.7'. Retraction of the plunger of the relay C.2'''' (Figure 1), for example, as herebefore described, closes, at bridge 73'''', a circuit through the wire j''' to the clutch C.7'''. This circuit originating at the source ZZ, passes through the wire s+ over the bridge 73'''' through the wire j''' to the clutch C.7''' and, thence, through the wire s- back to the source ZZ. The clutch C.7''' so energized, clutches and rotates its armature 62''', which is fixed together with the accumulator arm 61''', on the sleeve 60'''.

In the same manner and through similar circuits, the relays C.2'', C.2' controlled respectively by the levers 1'', 1', close circuit at the bridges 73'', 73', through the wires j'', j', on the clutches C.7'', C.7' (Figure 1) whose negative poles are connected with the wire s- and which transmit, respectively, motion to the accumulator arms 61'', 61', through the right lateral and middle members of the differential gearings df'', df'. The left lateral members of these differential gearings float respectively on the sleeves 60'', 60', and receive the carry over, as above described, from the next lower denominational orders, permitting thereby, the simultaneous operation of all orders of the calculating unit. The relays C.2'', C.2', close, at bridges 72'', 72', circuit through the wire h to the clutch C.5, in common with the relay C.2'''', or in the accumulation of a negative dividend involving reversed motion, to the clutch C.5a.

The accumulator arms 61', 61'', 61''' when set in motion, are severally and respectively arrested at angles of displacement determined by the levers 1', 1'', 1''', (Figure 2). Extending past all levers 1', 1'', 1''', are the wires b¹–b⁹. The wires b¹–b⁹ which correspond to the numerals 1 to 9 are shown as connected with terminals in the orbit of the timing arm 78 and as carried in a cable bb, to the levers 1', 1'', 1''' (Figures 1, 2). According to the angle at which such levers 1', 1'', 1''', be manually deflected, circuits are closed upon selected b wires (Figure 2) whence current flows through the levers 1', 1'', 1''' and the wires c', c'', c''' (Figures 2, 1) respectively, to the relays C.4', C.4'' C.4''', the connections being similar at all the levers 1', 1'', 1'''.

Let lever 1''' (Figure 2), the wire c''' and the relay C.4''' serve as an example. If the quantity corresponding to an intended dividend be 3; the lever 1''' is deflected, so that circuit is thereby closed from the wire b³ to the wire c''' carried by the lever 1''', and thence to the relay C.4'''. It is the function of the relay C.4''' when its circuit be completed at the timing arm 78 (Figure 1), through the wire a, closed by the master-switch 7 (Figure 2) at the conductor 12 on the wire s+ from the source ZZ (Figure 1), and the wires, b³, c''' to break, at bridge 70''' (Figure 1), circuit to the relay C.2''', causing the relay C.2''' to release its plunger. This deenergizes the clutch C.7''', which thereupon releases its armature 62''', interrupting, thereby, transmission of motion to the sleeve 60''' and the accumulator arm 61''', which is arrested at an angle of displacement corresponding in the present example to three units, as will presently appear. The accumulator arms 61'', 61' may be similarly and respectively arrested through the action of the relays C.4'', C.4' which break circuit to the clutches C.2'', C.2' at the bridges 70'', 70'.

The moment at which the relays C.4', C.4'', C.4''' shall break, respectively at bridges 70', 70'', 70''', circuit to the relays C.2', C.2'', C.2''', is timed by the timing arm 78 (Figures 1, 9, 10) which is rotated as above described, on the shaft 77.

The timing arm 78 carries a conductor 79, which, revolving, may close circuits between various pairs of terminals fixed, at the sides of its pathway upon benches. The position and the pathway of arm 78, between such benches 80, 80' is indicated diagrammatically in Figure 10.

Extensions of the wires b'–b⁹ (Figure 9) emerge from the cable bb, in recurrent series separated one from another, by neutral spaces which correspond to zero, from any one of which neutral spaces the timing arm 78 may enter on an operation.

Assume, as an example, that the positive quantity 598 were to be transmitted to the accumulator arm 61', 61'', 61''' (Figure 1). The lever 1' would be manually deflected, closing circuit through the wire e' at the bridge 5' (Figure 2) to the relay C.2' (Figure 1); and the circuit from the wire b⁵ (Figure 2) through the wire c' (Figures 2, 1) to the relay C.4'. Similarly, by manipulation of the levers 1″, 1‴ (Figure 2) circuits are closed respectively through the wires e″, e‴, to the relays C.2″, C.2‴ (Figure 1), and from the wires b⁹, b⁸ (Figure 2) through the wires c″, c‴ (Figures 2, 1) to the relays C.4″, C.4‴.

The master-switch 7 (Figure 2) is manually placed in position +, closing at the contact plate 9, current from the wire s⁻ on the wire dr leading over the bridge 98 at the relay C.11 to the negative pole of the clutch C.5, whose positive pole is connected through circuit of the wire h already traced, back to the source ZZ. At the contact plate 12, circuit is closed by the master-switch 7, from the wire s⁺ to the wire a (Figures 2, 1), leading to the series of terminals at the timing arm 78 (Figure 9). The push button P.1 (Figure 2) is then depressed, imparting an initial impulse over the bridges 49′, 49″, 49‴ (Figure 1) to the relays C.2′, C.2″, C.2‴, through the wire g, closed momentarily by a conductor of series 84 carried by the wheel 76 (Figures 1, 3).

The relays C.2′, C.2″, C.2‴ (Figure 1) energized momentarily through the wire g, contract their plungers and are held in stick by the circuit of s⁺ completing circuit through the wire h already traced, to the clutch C.5, and closing circuit, likewise, through the wire j′, j″, j‴, to the clutches C.7′, C.7″, C.7‴, as above described. The clutch C.5, likewise being energized, motion in clockwise direction is imparted by the motor M through the transmission already described, to the accumulator arms 61′, 61″, 61‴.

An extension of the wire g passes over the lower bridges of the relays C.23, C.22 to the positive pole of the clutch C.21 (Figure 1), from the negative pole whereof circuit is completed through the wire s⁻ back to the source ZZ. So energized, the clutch C.21 clutches the disk 74 and imparts initial motion through the disk 74, pinion 75, wheel 76 and shaft 77 to the timing arm 78 (Figure 9) rotated invariably, in clockwise direction.

When the timing arm 78 has advanced five steps, circuit is completed by the conductor 79 (Figure 9) from the wire a to the wire b⁵ closed at the lever 1′ (Figure 2) and through the wire c′ from the lever 1′ to the relay C.4′ (Figure 1) which, retracting its plunger, breaks at bridge 70′ circuit over the wire e′ to the relay C.2′ arresting thereby, as above described, the accumulator arm 61′ at an angular displacement of five steps. The lever 1‴ (Figure 2) closing circuit through the wire c‴ to the relay C.4‴ (Figure 1) from the wire b⁸ the accumulator arm 61‴ is arrested at an angular displacement of eight steps, when the timing arm 78 (Figure 1), reaches the terminal of the wire b⁸. Circuit is still closed by the relay C.2″ on the clutches C.5, C.7″, and the accumulator arm 61″ maintains its motion. As the timing arm 78 passes to the terminal of the wire b⁹, circuit is closed by the conductor 79 through the wires a, b⁹, c″ to the relay C.4″; and the accumulator arm 61″ is arrested at an angular displacement of nine steps. The operation of setting up the dividend thereby is completed, the accumulator arms 61′, 61″, 61‴, reflecting the quantity 598. Current through the wire h to the clutch C.5 now being wholly interrupted, the armature 57 (Figure 1) is released by the clutch C.5; and the transmission of motion from the motor M is broken to the shaft 58.

The push button P.1 is retained, during the above operation, by the solenoid C.28′ (Figure 2). When circuit is broken through the wire h, the relay C.28′ releases the push button P.1 which is restored to normal position by the spring s34′. The circuit of the wire h has been already traced. The negative pole of the solenoid C.28′ is connected with the wires s⁻ back to the source ZZ.

In order that the timing arm 78 (Figure 9) may not be arrested when current through the wire g fails, but may be advanced to a neutral position preparatory to a future operation; circuit to the clutch C.21 after its initial displacement, is sustained by current passing through an extension of the wire a (Figures 2, 1), a conductor of series 81 (Figure 3) at the wheel 76 (Figure 1), the bridges raised of the relay C.23, the bridge depressed of the relay C.22 to the clutch C.21, whence it passes through the wire s⁻ back to the source ZZ. The conductors 81 (Figure 3) are of the necessary arc to carry the timing arm 78 to an intermediate neutral position between two series of the b terminals in the orbit of the conductor 79 (Figure 9). In order to obviate the necessity of restoring the arm 78 to the normal position shown in Figure 9, preparatory to each operation, such series of b terminals are, as above described, recurrent throughout the entire orbit of the conductor 79.

In setting up a negative dividend at the accumulator arm 61′, 61″, 61‴ (Figure 1), the master-switch 7 (Figure 2) is placed in position —. The operation then involves the same mechanism and circuits as in setting up a positive dividend except that at the contact plate 12, circuit is closed from the positive pole of the source ZZ, to the wire i leading over the bridge 209 depressed at the relay C.14 and the bridge 101 raised at the relay C.12, to the positive pole of the relay C.11 (Figure 1) which breaks, at the bridge 98, the circuit of the wire dr to the clutch C.5, and closes at the bridge 99, the circuit of the wire dr to the relay C.5a, reversing, thereby, the motion of the members 61′, 61″, 61‴. The negative pole of the relay C.11 (Figure 1) is connected through the wire s⁻ back to the source ZZ. The relay C.12 is energized by the extension of the wire dr hereintofore traced, which leads to its negative pole. The positive pole of the relay C.12 is connected with the source ZZ, through the wire s⁺. The push button P.1 (Figure 2) is, as before depressed and the negative dividend is accumulated at the accumulator arms 61′, 61″, 61‴ (Figure 1).

Movement of the timing arm 78 (Figures 1, 9) is maintained, as in addition, until it reaches a neutral position between two series of b terminals, by current through the extension of the wire a passing through a conductor of series 81 (Figure 3) carried by the wheel 76 to the clutch C.21 (Figure 1).

As the accumulator advances from zero position in the accumulation of positive quantities, positive carry over is transmitted, during each successive tenth step displacement of the accumulator arms 61‴, 61″ (Figure 1) and borrowing is effected at successive first step displacements in opposite direction, so long as, at the accumulator, a positive quantity be latent. Means are provided whereby the transfer clutches C.8″, C.8′ at shaft 58, shall, similarly, as the accumulator advance from zero position in contra-clockwise direction, in the accumulation of negative quantities, transmit a negative carry-over additively at each successive tenth step displacement of the accumulator arms 61‴, 61″, so long as a negative quantity be latent at accumulator;

and borrow at successive first step displacements in relatively opposite direction. This now will be explained.

Referring to Figure 7, the shaft 58a carries the sleeves 60a', 60a'', 60a''' which are rotated respectively by the clutches C.7a', C.7a'', C.7a''' simultaneously with the sleeves 60', 60'', 60''', carried by the shaft 58 and rotated by the motor M through the clutches C.7', C.7'', C.7'''. Circuit is closed simultaneously at the bridges 73', 73a', through the wires j', ja', to the clutches C.7', C.7a'; through the wires j'', ja'' to the clutches C.7'', C.7a''; and circuit is closed simultaneously, at the bridges 73''', 73a''', through the wires j''', ja''', to the clutches C.7''', C.7a''', the negative poles of the clutches C.7', C.7a', C.7'', C.7a'', C.7''', C.7a''' being all connected through the wire s⁻ with the source ZZ.

The armature of the clutch C.7a' is the wheel 62a' (Figure 7) which floats on shaft 58a and transmits motion to the sleeve 60a', through a composite idler not shown but similar to the idler 67' (Figure 1), and the differential dfa' (Figure 7), the middle member of which is fixed to the sleeve 60a'. The armature of the clutch C.7a'' is the wheel 62a'', which floats on the shaft 58a and transmits motion to the sleeve 60a'' through a composite idler similar to idler 67'' (Figure 1), and the differential dfa'' (Figure 7), the middle member of which is fixed to the sleeve 60a''. The armature of the clutch C.7a''' is the disk 62a''' fixed to the sleeve 60a'''.

The carry-over, at the shaft 58a, is transmitted from the sleeve 60a''' to the sleeve 60a'', by the clutch C.8a''' integral with the sleeve 60a''', the geared armature 63a''' floating on shaft 58a, transmission similar to the pinion 64'' (Figure 1) shaft 65'', and the pinion 66'', to the left lateral member of the differential dfa'' (Figure 7) which floats on the sleeve 60a''. The carry-over is in like manner transmitted from the sleeve 60a'' to the sleeve 60a', by the clutch C.8a'' fixed to the sleeve 60a'', and transmission similar to the transmission 63'', 64', 65', 66' (Figure 1), and the differential dfa' (Figure 7), the left lateral member of which floats on the sleeve 60a'.

Integral with the sleeve 60a' is a clutch C.8a' (Figures 1, 7) similar to the clutches C.8a'', C.8a''' which transmits carry-over to a denominational order consisting of a single member, the armature 63a'. This order is higher than the highest order of the accumulator and corresponds to thousands, in the present drawings. The armature 63a' carries a conductor 90 (Figures 7, 8) which governs duplicate circuits to the clutches C.8a', C.8a'', C.8a'''.

The negative pole of the clutch C.8a' is connected with the source ZZ, through the wire s⁻. The negative poles of the clutches C.8a'', C.8a''', C.8''', are connected with the wire ds⁻ leading over the lower bridge at the relay C.19 to the source ZZ. The transfer members and appertinent elements at shaft 58a may collectively be termed the circuit controller.

When the calculating unit (Figure 7) is in zero position, the clutches C.8'', C.8''' of the accumulator, are in open circuit, the circuit of the wire d leading to the positive contact bands 36'', 36''', being broken at the bridge 92², and the circuit of the wire d' to the positive contact bands 38'', 38''' being broken at the bridge 92⁴. The clutches C.8'', C.8''', may then be displaced from zero in either direction without borrowing and thereby displacing higher orders. The contact bands 36'', 36''', 38'', 38''', extend each through 36° of arc.

When the calculating unit is at zero, the wires both da and da' leading to the clutches C.8a', C.8a'', C.8a''', are energized. The wire da is closed on the wire s⁺ leading from the source ZZ, at the bridge 92', and the wire da', is closed on the wire s⁺ at the bridge 92³. The terminals of wire da are in such position relatively to the positive contact bands 36a', 36a'', 36a''' which extend through 36°, that if a clutch C.8a', C.8a'', C.8a''', be displaced from zero in direction opposite to clockwise, as in the addition of positive quantities, a quantity is borrowed throughout ascending orders of the circuit controller at shaft 58a, and the armature 63a' (Figures 7, 8) is displaced 36° in direction opposite to clockwise.

The terminals of the wire da' are in such position relative to the positive contact bands 38a', 38a'', 38a''', which extend through 36°, that if a clutch C.8a', C.8a'', C.8a''' be displaced from zero in clockwise direction, as in the subtraction of a positive quantity, a quantity is borrowed throughout ascending orders at shaft 58a and the armature 63a' is displaced 36° in clockwise direction, (clockwise movement in Figure 8 being towards the left, because of viewpoint).

So long as operations remain within the zone of positive quantities, the armature 63a', displaced in direction opposite to clockwise, closes circuit from the wire s⁺ through the conductor 90, carried by the armature 63a, to the wire d. So long as operations be within the zone of negative quantities, the armature 63a', displaced in clockwise direction, closes circuit from the wire s⁺ through the conductor 90, to the wire d'.

When the wire d is closed by the conductor 90, circuit is completed to the relay C.25, the negative pole of which is connected through the wire s⁻ back to the source ZZ. The relay C.25 so energized retracts the plunger 91, common to the relay C.25', and closes at the bridge 92², circuit through an extension of the wire d to the clutches C.8'', C.8''', the contact bands 36'', 36''' at which are so placed relatively to the terminals of the wire d, that the coils C.8'', C.8''' are energized at each tenth step displacement clockwise in every revolution, and at such tenth step displacement additively transmits a positive carry-over. At each first-step displacement in opposite direction within the zone of positive quantities the clutches C.8'', C.8''', borrow. So long as operation remains within the zone of positive quantities, the wire d is active.

When the wire d' is closed by the conductor 90, circuit is completed to the relay C.25', the negative pole of which is connected through the wire s⁻ back to the source ZZ. The relay C.25' so energized retracts the common plunger 91; and closes at the bridge 92⁴ circuit through an extension of the wire d' to the clutches C.8'', C.8''', the contact bands 38'', 38''' at which, are placed relatively to the terminals of the wire d', that the clutches C.8'', C.8''', are energized at every tenth step displacement in every revolution opposite to clockwise, and at such tenth step displacement transmit a negative carry-over. At each first step displacement clockwise, within the zone of negative quantities, the clutches C.8'', C.8''', borrow. So long as the operation remains within the zone of negative quantities, the wire d is active.

When the wire d is active, circuit is broken at the bridge 92³ from the wire s⁺ to the wire da', which remains open, and is closed at the bridge 92' from the wire d through the wire da to the clutches C.8a', C.8a'', C.8a''', which, so long as the operation remains within the zone of positive quantities, borrow while the clutches C.8′′, C.8′′′ are additively transmitting positive carry-over; and transmit carry-over, while the clutches C.8′′, C.8′′′, borrow.

When the wire $d'$ is active, circuit is broken at the bridge 92′ from the wire $s^+$ to the wire $da$, which remains open, and is closed at the bridge 92³, from the wire $d'$ through the wire $da'$ to the clutches C.8a′, C.8a′′, C.8a′′′, which so long as the operation remains within the zone of negative quantities borrow while the clutches C.8′′, C.8′′′ are additively transmitting negative carry-over; and transmit carry-over, while the clutches C.8′′, C.8′′′ borrow.

A first unit displacement as the calculating unit passes from zero position, into either positive or negative quantities, causes borrowing, as above described, at the circuit controller clutches C.8a′, C.8a′′, C.8a′′′, which displaces the armature 63a′. Conversely, as the calculating unit returns to zero position, through either positive or negative quantities, the last step displacement of a clutch C.8a′, C.8a′′, C.8a′′′, causes a carry-over to be transmitted to the armature 63a′, which is thereby restored to normal position, throwing the wires $d$, $d'$, and the clutches C.8′′, C.8′′′ again into open circuit; and permitting the bridges 91′, 91³ again to close circuit from the wire $s^+$ through the wires both $da$ and $da'$, leading to the dual contact series 36a, 38a at clutches C.8a′, C.8a′′, C.8a′′′.

The dividend having been set up at the accumulator 61′, 61′′, 61′′′ (Figure 1), the divisor is set up at the levers 1′, 1′′, 1′′′. Assume the operation 598÷26=23. In Figures 19, 20, 21, presently explained, means are provided whereby the divisor 26 may be set up at the levers 1′′, 1′′′ corresponding to tens and units, the operation then being automatically shifted so as to cause the divisor to operate first upon the hundreds and tens orders of the dividend. To like effect, in order that the divisor 26 first operate upon the hundreds and tens orders of the dividend 598, the divisor 26, for purposes of present illustration, may be manually set up, at the levers 1′, 1′′, (Figure 2), the disks 40′, 40⁵ being shown in Figures 4 and 5, in position to accommodate the operation.

The lever 1′ is deflected so as to close on the wire $b^2$ (Figure 2); and the lever 1′′ is deflected so as to close on the wire $b^6$.

The master switch 7 (Figure 2) is, for reasons which will presently appear, placed in position ÷ (+) or ÷ (−), according to the positive or negative quality of the divisor, irrespective of the quality of the dividend which conceivably may be unknown; and the push-button P.3 is depressed, imparting to the relays C.2′, C.2′′, (Figure 1) an initial impulse through the wire $g$ closed at the wheel 76 by a conductor of the series 86 (Figure 3).

Displacement of the master switch 7 (Figure 2) as above specified, closes at the contact plate 9 circuit of the wire $s^-$ from the source ZZ (Figure 1) to the wire $u$ (Figures 2, 1) leading through a conductor of series 89 at the wheel 76 (Figures 1, 3) over the bridge 94 when raised, at the relay C.10, and over the bridge 98 or the bridge 99 at the relay C.11, to the clutch either C.5a or C.5, according to the positive or negative quality of the dividend which may be unknown. The wire $u$ also closes circuit at the bridges 94, 93, when raised, to the relay C.10, which it may hold in stick; and at the bridge 96 raised, may close circuit to the negative pole of the relay C.30 (Figure 2) which is operative in developing the quotient, as presently described.

Closed by the master switch 7 at the contact plate 10 (Figure 2) is the wire $v$ leading from a comparator (Figure 13) presently described, to the wire $dp$ (Figure 1) which may impart initial impulse to the relay C.10.

Closed by the master switch at the contact plate 12 (Figure 2) is circuit from the source ZZ through the wire $s^+$ to the wire $a$ (Figures 2, 1) leading, as in addition and subtraction, to the timing arm 78 (Figures 1, 9) and to the relay C.23, and clutch C.21 (Figure 1).

Closed likewise by the master switch 7, at contact plate 12 (Figure 2), is circuit from the wire $s^+$ to the wire $x$ (Figures 2, 1), which leads through the conductors 88 (Figures 1, 3) to the clutch C.26 (Figure 1); and closed at the contact plate 12 is circuit through the wire $o$ (Figures 2, 1).

The push-button P.3 (Figure 2), when depressed, closes at the bridge 32′′′ carried by its plunger, circuit to the solenoid C.28′′′, which is in the circuit of the wire $s^-$ and of the wire $y$; and holds the push-button P.3 in depressed position, until division be completed, current to the solenoid C.28′′′ then being broken as the wire $y$ is thrown into open circuit at the conductor 41 (Figure 5). The push-button P.3 is then restored to normal position by the spring S.34′′′ (Figure 2).

Depression of the push-button P.3 imparts through wire $g$ initial impulse to the relays C.2′, C.2′′, and the clutch C.21 which rotates the disk 76. An operation in the nature of subtraction follows, after which it becomes necessary to determine whether the remainder be less than the divisor, or whether further subtraction may follow at the higher columns. This is accomplished by means of a comparator (Figure 13) which may now be described.

The accumulator arms 61′, 61′′, 61′′′ (Figure 1) carry, each at its extremity two terminals, the terminals 237′, 237′′, 237′′′ (Figure 7) closing circuits to the recording mechanism and the terminals 119′, 119′′, 119′′′ (Figures 1, 13) closing circuits of the comparator, wherein current flows from the negative pole of the source ZZ (Figures 1, 13) through the wire $s^-$, to a fixed terminal 117′ which floats on a revolving conductor 118′ attached to the base of the accumulator arm 61′ and thence to the terminal 119′ fixed at the other extremity of the accumulator arm 61′. The terminal 119′ may close circuit according to the angular position of the accumulator arm 61′ on any one of the contacts 120⁰–120⁹, which are wired respectively to corresponding terminals 121⁰–120⁹ at the sector 122′.

The sector 122′ and the sectors 122′′, 122′′′ fixed respectively to the shafts 3′, 3′′, 3′′′ (Figures 2, 11, 13) of the levers 1′, 1′′, 1′′′, are similar in construction and in purpose. Each carries an isolated contact such as 123′ (Figure 11), closed in normal position upon the terminal 121⁰ and capable of engaging the other terminals 121′–121⁹ when the sector 122′ is displaced by the lever 1′. The sector 122′ carries also a conductor 124′ closing, when in normal position, on the terminals 121′–121⁹.

When the lever 1′ (Figures 1, 11) is deflected, the position of the isolated contact 123′, relatively to the terminals 121⁰–121⁹, corresponds to the $b$ wire selected as a numeral of the divisor, at the lever 1′. Assuming that the divisor be 26, and the lever I' be closed on the wire $b^2$, the isolated contact 123' would then close on the terminal 121². If the first numeral of a dividend or a remainder, were equal to the first numeral 2 of the divisor, the accumulator arm 61' (Figure 13) would then close circuit at the contact 120², through the wire $p^2$, to the terminal 121² and the isolated contact 123'. If the first numeral of a dividend or remainder were greater than the first numeral 2 of the divisor, for example, 3; the accumulator arm 61' would close circuit at the contact 120³ through the wire $p^3$ to the terminal 121³ to the conductor 124', whence the current is short-circuited, through the wires $v'$, $v$, $dp$, closed by the master switch 7 at the contact plate 10, to the relay C.10, and clutch C.5a; and a subtraction follows, a single excess unit in the dividend or remainder at a higher denominational order, being greater than any possible divisor at all columns therebelow.

If the first numeral of the dividend or remainder were less than the first numeral of the divisor, for example, 1; then the circuit closed by the accumulator arm 61' (Figure 13) at the contact 120', through the wire $p'$, to the terminal 121' would connect neither with the isolated contact 123' nor with the conductor 124'; no current would flow through the accumulator arm 61' to the relay C.10, and clutch C.5a; and the shafts 58, 58a are not revolved.

If again, the first numeral in the dividend or remainder were equal to the first numeral of the divisor, to wit 2, current would flow from the source ZZ, through the wire $s^-$, the terminal 117', the conductor 118', the accumulator arm 61', the terminal 119', the contact 120², the wire $p^2$, to the terminal 121², and through the isolated contact 123' over the wire $t'$ to the conductor 118'', the accumlator arm 61'' and the terminal 119''. If the second numeral of the dividend or the remainder be greater than the second numeral of the divisor; circuit is closed by the accumulator arm 61'' through a wire $q^0$–$q^9$ onto the conductor 124'' at the sector 122'', whence current flows through the wires $v''$, $v$, $dp$, to the relay C.10 and clutch C.5a. If the second numeral of the dividend or the remainder be less than the second numeral of the divisor; circuit is closed neither on the isolated contact 123'' nor the conductor 124'', and current fails. If the second numerals of the dividend and the divisor be equal, circuit is closed through the isolated contact 123'' over the wire $t''$ to the terminal 117''', the conductor 118''', the accumulator arm 61''', to the terminal 119''', at the lowest order; where again, the numeral of the dividend or remainder may be larger than the corresponding numeral of a divisor and circuit be closed, on the conductor 124''', in which event, current flows through the wires $v'''$, $v$, $dp$, to the relay C.10, and the clutch C.5a. Should the numeral of the dividend or remainder be smaller than a corresponding numeral of a divisor, here again, circuit would close on neither the conductor 124''' nor on the isolated contact 123''' and current to the relay C.10, and the clutch C.5a, would fail.

Be it assumed, however, that the numeral of the dividend or remainder reflected at the accumulator 61''' be equal to the corresponding numeral of the divisor. Current would then flow through the isolated contact 123''', the wire $t'''$, the wire $v$, contact plate 10 (Figures 3, 13), wire $dp$ (Figures 3, 1, 13), to the negative poles of the relay C.10 and clutch C.5a.

The positive pole of the relay C.10 (Figure 1) is connected through the wires $s^+$ with the source ZZ. When circuit be completed to the relay C.10 over the wires $v$, $dp$, from any order of the comparator (Figure 13), the relay C.10 retracts its plunger, closing, thereby, over bridge 99 at the relay C.11, circuit of the wire $dp$ to the negative pole of the clutch C.5a whose positive pole is connected through circuit of the wire $h$, already traced, back to the source ZZ (Figure 1). A subtraction of the divisor from the dividend or the remainder follows, in manner hereinbefore described.

The current from the comparator (Figure 13) through the wires $v$, $dp$ (Figures 13, 1) imparts only an initial impulse to the relay C.10; since circuit through the wires $v$, $dp$, is forthwith broken, as the accumulator arms 61', 61'', 61''', are displaced. The action of the relay C.10, and clutch C.5a is however sustained by circuit through the wire $u$ which is closed at the bridges 93, 94, when the relay C.10 retracts its plunger. This circuit originates at the source ZZ (Figure 1) and passes through the wire $s^-$ (Figures 1, 2), the contact 9 at the master switch 7 (Figure 3) the wire $u$ (Figures 2, 1), a conductor of the series 89 at the wheel 76 (Figures 1, 3) the bridges 94, 93 (Figure 1), the relay C.10, and thence through the wire $s^+$ back to the source ZZ. The extension of the wire $u$ which leads from the bridge 94 over the bridge 99 at the relay C.11, sustains circuit to the clutch C.5a.

Returning to the operation 598÷26, the initial position of the accumulator arms 61', 61'', 61''' (Figure 13) after the dividend has been set up, is such that they close circuits respectively at the contacts 120⁵ to the terminal 121⁵; contact 126⁹ to the terminal 127⁹; and contact 128⁸ to the terminal 129⁸. The numerals of the divisor 26 are reflected respectively in the positions of the sectors 122', 122'', which cause the isolated contact 123' to close on the terminal 121², and the isolated contact 123'' to close on the terminal 127⁶. Since the terminal 121⁵ is closed on the conductor 124', current is short-circuited to the relay C.10, and clutch C.5a. The remainder, after the first subtraction, is 338, the accumulator arms 61', 61'', 61''' now closing on the contacts 120³, 126³, 128⁸. The first two numerals 33 of the remainder permit of subtraction by the divisor 26; and current being again short-circuited, at the conductor 124' to the relay C.10, and clutch C.5a, a second subtraction follows, as circuit is again closed, through the wire $g$ at a conductor 86 (Figure 3) to the relays C.2', C.2'' (Figure 1).

In these successive operations, movement of the timing arm 78 is maintained until it reaches a neutral point between two series of $b$ terminals (Figure 9) by circuit of the wire $a$ to the relay C.21 (Figure 1) closed by conductors of the series 81 (Figure 3), as in operations of addition and subtraction.

At the termination of the second subtraction the quantity in the first order of the divisor is exhausted; a first numeral 2 being developed in the quotient, to be reflected as presently described. The remainder is reduced to 78; and the accumulator arm 61' closes circuit at the contact 120⁰ to the terminal 121⁰, where circuit is completed neither to the isolated contact 123' which remains closed on the terminal 121²; nor to the conductor 124'. Current to the relay C.10 and clutch C.5a thus fails; and subtraction must be shifted to lower denominational orders.

The arc of the conductors 89 (Figure 3) is such, that the circuit through the wire $u$ which sustains the relay C.10, and clutch C.5$a$ (Figure 1) following an initial impulse, through the wires $v$, $dp$, is interrupted during the passage of the arm 78 from the terminals of the wire $b^9$ (Figure 9) to a neutral position between series; permitting, thereby, the relay C.10 (Figure 1) to release its plunger, between successive subtractions, unless the accumulator arms 61', 61'', 61''' (Figure 13) have, in the meantime, been arrested at contacts which again close circuit to the relay C.10 through the wires $v$, $dp$. If at the termination of a subtraction, the remainder permits of further subtraction at the same columns, circuit remains closed to the relay C.10, through the wires $v$, $dp$. If the remainder does not permit of further subtraction at these columns, the plunger of the relay C.10 is released, and closes at bridge 96 (Figure 1), circuit to the negative pole of the clutch C.26. As the arm 78 passes from a terminal of the wire $b^9$ to a neutral position between series, circuit is closed by a conductor of series 88 (Figure 3) through the wire $x$ (Figures 2, 1) already traced, to the positive pole of the clutch C.26 (Figure 1) completing, if the plunger of the relay C.10 be relased, circuit to the clutch C.26. So energized, the clutch C.26 clutches the transmitter 40 and shifts, the circuits of the $c$ and $e$ wires to the relays of lower orders and permits, thereby, the divisor established at the levers 1', 1'', in the present demonstration, to operate respectively, on the tens and units orders of the mechanism, having passed from the hundreds and the tens; the wires $e'$ $c'$ to relays C.2', C.4', being thrown into open circuit at the disk 40' (Figure 4).

The divisor in the present example being 26, and the remainder now being 78, three subtractions are permitted before an eventual second shift of circuits. The remainder 78 is reduced to zero by such three subtractions; and 3 appears as the last numeral in the quotient consistently with the equation $598 \div 26 = 23$. As all the accumulator arms 61', 61'', 61''' (Figure 13) are then at zero, current to the relay C.10 and clutch C.5$a$ fails. Since, however, circuit remains closed at the conductor 41 (Figure 5) through the wire $y$ to the solenoid C.28''' (Figure 2), the pushbutton P.3, maintains current to the wire $g$, which continues to impart initial impulse to the clutch C.21 (Figure 1); and the wheel 76 revolving provokes further shifts of the $c$, $e$, circuits downwards to lower orders, at the transmitter 40. The first of such said concluding shifts throws the wires $c''$, $e''$ to the relays C.2'', C.4'' into open circuit at the disk 40' (Figure 4); and the second shift throws into open circuit the wires $c'''$, $e'''$ to the clutches C.2'''', C.4'''. The disk 40⁵ (Figure 5) is then in position at which the wires $y$ and $g$ become inactive, and the conductor 43 (Figure 5) is carried to the fixed terminals 44 and closes circuit to the clutch C.26, through the wire $s^+$ from the source ZZ, the negative pole of the clutch C.26, as hereinbefore described, being connected with the source ZZ through the wire $s^-$. The clutch C.26 so energized, clutches and rotates the transmitter 40 onwards to zero position, the conductor 43 being of such arc that when said transmitter reaches zero position, circuit to the clutch C.26 fails.

To provide for dividends not exactly divisible by their divisors, lower orders may be provided, as disclosed in Figures 19, 20, 21, which carry the quotient into decimal fractions; before circuits through the $c$, $e$ wires finally may fail. Such lower orders may be substantially similar to the hundreds, tens and units orders shown in Figure 1, the tenths order transmitting carry-over to the units order through mechanism similar to that hereinbefore described.

When the transmitter 40 (Figure 1) switches the $c$, $e$ wires downward onto C.4, C.2 relays of lower orders, it is necessary to shift progressively the $p$, $q$, $r$ wires of the comparator (Figure 13) upwards to connections at the levers where the divisor is established, in the present example, to connections at the levers 1', 1'' (Figure 2): in order that the remainder 78, in the present example, reflected after the first partial operations by the accumulator arms 61'', 61''' (Figure 13) may be compared with the divisor 26, still reflected at the sectors 122', 122''. The wires $p^0$–$p^9$ leading from the accumulator arm 61' are accordingly, switched into open circuit, the wires $q^0$–$q^9$ leading from the accumulator arm 61'' are switched to the terminals 121⁰–121⁹ at the lever 1', and the wires $r^0$–$r^9$ leading from the accumulator 61''' are switched to the terminals 127⁰–127⁹ at the lever 1''. This is accomplished by means of conductors carried on the disks 40², 40³, 40⁴, shown in Figures 1 and 14, these disks 40², 40³, 40⁴, in view to clearness, not being shown in Figure 13.

Referring to Figure 14, the wires $p^0$–$p^9$ are represented as severally carried in the cable $pp$ from the contacts 120⁰–120⁹ at the accumulator arm 61', to the fixed bench 130 at the disk 40², where they close respectively on the conductors 151⁰–151⁹, which in turn close circuit through terminals carried by the fixed bench 130' to the terminals 121⁰–121⁹ at the lever 1', the extensions of the wires $p^0$–$p^9$ being shown as carried in the cable $pp'$. The wires $q^0$–$q^9$ are similarly represented as carried in the cable $qq$ from the contacts 126⁰–126⁹ at the accumulator arm 61'' to the fixed bench 135, at the disk 40³, where they close respectively on the conductors 152⁰–152⁹ which, in turn, close circuit through terminals carried by the fixed bench 135', to the terminals 127⁰–127⁹ at the lever 1'', the extension of the wires $q^0$–$q^9$ being shown as carried in the cable $qq'$. The wires $r^0$–$r^9$ are similarly represented, as carried from the contacts 128⁰–128⁹ at the accumulator arm 61''' in the cable $rr$, to the fixed bench 141 at the disk 40⁴ where they close, respectively, on the conductors 153⁰–153⁹, which, in turn, close circuit, through terminals carried by the fixed bench 141', to the terminals 129⁰–129⁹ at the lever 1''', the extension of the wires $r^0$–$r^9$ being shown as carried in the cable $rr'$.

The wire $s^-$ is shown in Figure 14 as extending from the source ZZ to a fixed terminal 132 at the disk 40². Fixed to the sleeve of the transmitter 40 and rotating with the disk 40² is the conductor 131 (Figures 1, 14) which in normal position closes circuit between the fixed terminals 132 (Figure 14) and a fixed terminal 132'. An extension of the wire $s^-$ carries current to the conductor 118' at the accumulator arm 61', which closes circuit as hereintofore described, on the wires $p^0$–$p^9$ (Figure 13).

Assume, for example, that the accumulator arm 61' is closed on the contact 120² (Figure 13), that the isolated contact 123' were opposite the terminal 121², and that the accumulator arms 61'', 61''', and the levers 1'', 1''' were all at zero. Current originating at the source ZZ (Figure 14) would then flow through the wire $s^-$, the fixed terminal 132, conductor 131 to the fixed terminal 132', extension of the wire $s^-$, conductor 118', accumulator arm 61', contact 120² (Figure 13) wire $p^2$ carried in the cable $pp$ (Figure 14) to the terminal of the wire $p^2$ at the fixed bench 130, through the conductor 151² to the extension at bench 130' of the wire $p^2$ carried in the cable $pp'$ to the terminal 121² (Figure 13) closed on the isolated contact 123' at the sector 122'. Current would then flow through the wire $t'$ to the fixed terminal 138 at the disk 40³, (Figure 14), through the conductor 137 (Figure 14) which revolves with the transmitter and disk 40³, to the fixed terminals 138', and thence through an extension of the wire $t'$ to the conductor 118'', through accumulator arm 61'', the contact 126⁰ (Figure 13) the wire $q^0$, carried in the cable $qq$ (Figure 14) to the fixed bench 135 at disk 40³, the conductor 152⁰ to the extension of the wire $q^0$ leading from the fixed bench 135' and carried in the cable $qq'$ to the terminal 127⁰ (Figure 13), which is closed on the isolated contact 123'': thence through the wire $t''$ (Figure 14) to the fixed terminal 145 at disk 40⁴, the conductor 144 (Figure 14) which is fixed to and revolves with the transmitter and the disk 40⁴, the fixed terminal 145', an extension of the wire $t''$, conductor 118''', accumulator arm 61''', contact 128⁰ (Figure 13), the wire $r^0$ carried by the cable $rr$ to the fixed bench 141 (Figure 14) at disk 40⁴, the conductor 153⁰ to an extension of the wire $r^0$ leading from the fixed bench 141' and carried in cable $rr'$, to the terminal 129⁰ (Figure 13), which closes on the isolated contact 123'''; whence current flows through the wires $t'''$, $v$, contact plate 10, at the master switch 7, and the wire $dp$, to the relay C.10, and thence through the wire $s^+$ back to the source ZZ (Figures 1, 14, 25).

When a remainder is reached in the upper orders of the dividend, which is less than the divisor, and the transmitter 40 (Figure 1) is displaced as hereintofore described, the disk 40² (Figure 14) rotates the conductors 151⁰–151⁹ and switches the wires $p^0$–$p^9$ into open circuit at the bench 130. The disk 40³ similarly breaks at the benches 135, 135', the circuit of the wires $q^0$–$q^9$ carried in the cable $qq$; and, at the benches 136, 136', switches these wires $p^0$–$p^9$ through the conductors 152⁰–152⁹ to the extensions of the wires $p^0$–$p^9$ leading from the fixed bench 136' and shown as carried in the successive cables $pq$, $pp'$ to the terminals 121⁰–121⁹ at the lever 1'. Similarly the disk 40⁴ is revolved, breaking at the fixed bench 141 circuits of the wires $r^0$–$r^9$ carried in the cable $rr$, and switching at the fixed benches 142, the circuits of 142' the wires $r^0$–$r^9$, through the conductors 153⁰–153⁹, to the extensions of the wires $r^0$–$r^9$ leading from the fixed bench 142', and shown as carried in the cables $qr$, $qq'$, to the terminals 127⁰–127⁹ at the lever 1''.

Simultaneously with shift of circuits through the $p$, $q$ and $r$ wires, the circuit of the wire $s^-$ (Figure 14) extended to the accumulator arm 61' is broken at disk 40² by the revolving conductor 131, at the fixed terminals 132, 132', and is closed by the revolving conductor 137 at the disk 40³, through the fixed terminals 139, 139', to the extension of the wire $t'$ leading to the accumulator arm 61''. Similarly the circuit of the wire $t'$ leading from the isolated contact 123' at the lever 1' is broken at the fixed terminals 138, 138' at the disk 40³, and is closed at the fixed terminals 146, 146', by the conductor 144 at the disk 40⁴, to the extension of the wire $t''$, leading to the accumulator arm 61'''. The section of the wire $t''$ leading from the lever 1'', is switched into open circuit, at the fixed terminal 145, but the disk 40⁴ revolving, carries the contact plate 159 attached to the periphery of the disk 40⁴ to the fixed terminals 160 and closes circuit from the wire $t''$ to the wire $vt''$ leading to the wire $v$, whence it extends through the contact plate 10 and the wire $dp$, to the relay C.10. Since the wires $r^0$–$r^9$ have been shifted from the terminals 129⁰–129⁹ at the lever 1', the wire $t'''$ is now in open circuit.

A second shift of circuits by the transmitter 40 when the remainder is again reduced to a quantity less than the divisor, switches the wires $q^0$–$q^9$ leading from the contacts 126⁰–126⁹ (Figure 13) into open circuit; and wires $r^0$–$r^9$ from contacts 128⁰–128⁹ at the accumulator arm 61''', from the bench 142 (Figure 14) to the bench 143, whence circuit is closed through the conductors 153⁰–153⁹, to the bench 143', and extensions of the wires $r^0$–$r^9$ carried by the cables $pr$ and connecting with the wires carried by the cables $pq$, $pp'$, leading to the terminals 121⁰–121⁹ at the lever 1'. Circuit through the wire $t'$ is broken at the fixed terminal 146 at the disk 40⁴. Circuit through the wire $s^-$ is broken at the fixed terminal 139 at the disk 40³ and is closed at the disk 40⁴, through the fixed terminals 147, 147' by the conductor 144, to the extension of the wire $t''$ leading to the accumulator arm 61'''. Circuit through the section of the wire $t'$ which leads from the isolated terminal 123' is broken at the terminals 160; and the contact plate 161 fixed to the periphery of the disk 40³ advancing, closes at terminals 162, circuit from the lower section of the wire $t'$ to the wires $vt'$, $v$, $dp$ to the relay C.10 (Figures 1, 14).

It has been assumed that the quantity in the highest order of the dividend or remainder, is reduced to zero, before circuits are shifted by the transmitter 40 (Figure 1). An exhausted remainder may, however, remain in such highest order or subsequent highest orders, after a shift of circuits; and must be subject to the subtractions which ensue. Provision for such contingency, now will be described.

At the first shift of circuits by the transmitter 40 (Figure 14), circuit through the wire $s^-$ is broken at the fixed terminal 132, disk 40², but is switched by the conductor 131 at the fixed terminals 133, 133', to an extension $as'$ leading to a terminal at which circuit may be closed by the relay C.34'. The disk 40² revolving, carries the contact plate 155 attached to the periphery of the disk 40², to the terminals 156 and closes circuit from the wire $as'$, to the extension of the wire $s^-$ leading to the accumulator arm 61'; as circuit to this extension of the wire $s^-$ is broken at the terminals 132, 132' and the circuits of the wires $p^0$–$p^9$ are broken at the bench 130. The negative pole of the relay C.34' is connected with the contact 120⁰ (Figures 13, 14); its positive pole with the wire $s^+$ (Figure 14). The circuit so closed originates at the source ZZ and passes through the wire $s^-$, the conductor 131, the wire $as'$, the contact plate 155, extension of the wire $s^-$, conductor 118', the accumulator arm 61', contact 120⁰, the relay C.34', and thence through the wire $s^+$ back to the source ZZ. If, when circuit be shifted by the transmitter 40 (Figure 1), the accumulator arm 61' be at zero, circuit is completed to the relay C.34' (Figure 14) which retracting its plunger breaks, at the bridge thereto attached, circuit with the terminal of wire $as'$.

If, on the contrary, a numeral exist in the highest order of the remainder, after shift of the divisor to lower decimal orders, and the accumulator arm 61' does not close circuit at the contact 120⁰ to the relay C.34'; the plunger thereof remains released, and closes circuit at its bridge, through the wire av' to the wire v, and thence through the wire dp to the relay C.10, as already traced. The current so passing through the wires av', v, dp, sustains the relay C.10, and prevents a further shift of circuits by the transmitter 40 (Figure 1), until subtraction of the divisor from the remainder, reduces to zero the numeral in the highest order of the remainder and carries the accumulator arm 61' back to zero.

The circuit which may be so closed by the relay C.34' originates at the source ZZ (Figure 14); and passes through the wire s−; as already traced, the bridge at the plunger of the relay C.34', the wires av', v, dp, already traced, to the relay C.10 and then through the wires s+ back to the source ZZ.

If the accumulator arm 61", at the next lower order, were to reflect a numeral in the remainder, after shift of circuits to orders therebelow; the wire as" closed at the terminals 140, 140' (Figure 14), would in similar manner, operate upon the relay C.34", when at the second shift of circuits by the transmitter 40, the contact 159 carried at its periphery by the disk 40³ closes, at the terminals 158, circuit to the accumulator arm 61" through the wires as" and the extension of the wire t'. So long as the accumulator arm 61" were not restored to zero position by subtraction of the divisor from the remainder, circuit would be closed at the bridge depressed on the plunger of the relay C.34"; and current would flow from the wires as", av", through the wires v, dp, to the relay C.10; and this circuit would be broken only when the accumulator arm 61" is restored to zero, where it closes circuit to the relay 34".

*Division of a negative quantity*

If the dividend reflected by the accumulator arms 61', 61", 61'" (Figure 2) be a negative quantity, the direction of their movement must be clockwise, in response to the subtractions of the divisor, which ensue. This is automatically accomplished through the relays C.11, C.12 (Figure 1), as now will be described.

In division, the wire dr being inactive, the plunger of the relay C.12 is released; and may close, at the bridge 101 (Figure 1) thereto attached, circuit through the wire d'; to the relay C.11. When the dividend is positive, circuit through the wire d' is open at the conductor 90 (Figures 7, 8), as hereinbefore described; and the plunger of the relay C.11 (Figure 1) being released, current flows through the wires dp and u over the bridge 99 at the relay C.11 to the clutch C.5a, resulting in subtraction at the accumulator arms 61', 61", 61'", in direction opposite to clockwise. When the quantity constituting the dividend is negative, circuit is closed at the conductor 90 as hereinbefore described, through the wire d', already traced, over the bridge 101 at the relay C.12, to the positive pole of the relay C.11, the negative pole whereof, as hereintofore described, being connected, through the wire s−, back to the source ZZ. The relay C.11 so energized retracts its plunger, breaking at the bridge 99 the circuits of the wires dp, u to the clutch C.5a and switches, at the bridge 98, the circuits of the wires dp, u to the clutch C.5. Motion in clockwise direction is thereby transmitted to the accumulator arms 61', 61", 61'", and to the clutches C.8", C.8'" at which the action of transfer mechanism, hereintofore described, permits of operation at first step transfer exactly similar to the subtractions of the divisor from a positive dividend, save that the motion of the accumulator arms 61', 61", 61'" is reversed.

The dividend and remainders being negative quantities, the angular step displacement of the accumulator arms 61', 61", 61'", must now read from zero to the left, in order to permit the comparator (Figure 13) correctly to determine when the remainders are reduced to less than the divisor; and shift of circuits be duly effected by the transmitter 40 (Figure 1). This is accomplished by means of the relay C.24 (Figures 1, 12), which is provided with a trifurcated plunger with bridges attached to each of its three branches. Extending from the contacts 128⁰–128⁹ at the accumulator arm 61'" to the terminals at the left branch of the relay C.24, are the wires r–r⁹ (Figure 13) shown (Figure 1) as carried in the cable rr. The wires q'–q⁹ (Figure 13) shown as carried in the cable qq (Figure 1) are similarly extended from their contacts 126'–126⁹ (Figure 13) at the accumulator arm 61", to terminals at the middle branch of the coil C.24 (Figure 1); and the wires p'–p⁹ (Figure 13) carried in the cable pp (Figure 1) are shown as extended from the contacts 120'–120⁹ (Figure 13) at the accumulator arm 61' to terminals at the right branch of the relay C.24 (Figure 1). At the opposite sides of the several branches, are terminals from which the p, q and r wires are extended through the transmitter 40 (Figure 1), to their respective terminals at the sectors 122', 122", 122'" (Figures 2, 13). The wires p⁰, q⁰, r⁰ extend to the terminals 121⁰, 127⁰, 129⁰, without passing over bridges of the relay C.24.

The relay C.24 (Figure 1) is in the circuit of the wire d' already traced, its negative pole being connected through the wire s− back to the source ZZ. When, as already explained, the dividend is a positive quantity, circuit is not closed by the switch 90 (Figure 16) on the wire d'; and the relay C.24 accordingly is not energized. When, on the other hand, the dividend be negative, circuit is closed through the wire d'; and the plunger of the relay C.24 is retracted. Th operation may be followed in Figure 12, in which, with a view to clearness, connections at the transmitter 40 (Figure 1) are not shown. When the dividend is a positive quantity and the plunger of the relay C.24 (Figure 12) is not retracted; circuit may be closed from the contacts 120'–120⁹, for example, by the accumulator arm 61', through the wires p'–p⁹ respectively, over the bridges carried by the right branch of the plunger of the relay C.24 to the terminals 121'–129⁹ opposite the sector 122' at the lever 1'. When the dividend is negative and the wire d' active, the plunger of the relay C.24 is retracted; the circuits from the contacts 120'–120⁹ closed by the accumulator arm 61' are transposed, and the wires p'–p⁹ of complementary ordinal number are switched to the terminals 121'–121⁹. The circuit of the wire p⁰ remains connected with the terminal 121⁰. The circuit from the contact 120' to the terminal 121', for example, is broken at the lowest bridge on the right branch of the relay C.24, and closed at the highest bridge thereon, to the terminal 121⁹. Circuit from the contact 120² is similarly switched from the terminal 121², to the terminal 121⁸. The operation is similar at all branches of the plunger; and the circuits through all the p, q, r wires are simultaneously switched to their respective complementary terminals at the sectors 122', 122", 122'". The comparator (Figures 12, 13, 14) is then in a condition to determine when, in division of negative quantities, the remainder is reduced to a quantity less than the divisor.

The quotient

The quotient is reflected at the quotient arms 27', 27", 27'" (Figure 2) corresponding respectively to hundreds, tens and units and rotated through the action of the solenoids C.31', C.31", C.31'". The relay C.30 (Figure 2) is in a circuit which originates at the source ZZ and passes through the wire s⁻ (Figures 1, 2) contact plate 9 at the master switch 7, the wire u, already traced, over the bridge 96 when raised at the relay C.10, the relay C.30, the wire g (Figures 2, 1), the bridge 95 when raised at the relay C.10 (Figure 1), a conductor of series 86 at wheel 76 (Figure 3), the highest bridge at the push-button P.3 (Figure 2), and through the wire s⁺ (Figures 2, 1) back to the source ZZ (Figure 1).

When the push-button P.3 (Figure 2) is depressed at the beginning of division, assuming that the divisor be not greater than the dividend and that circuit be not broken at the bridges of the relay C.10 (Figure 1), circuit is closed on the relay C.30 (Figure 2) which completes through the bridge thereon, circuit through an extension of the wire u, already traced, to the negative pole of the solenoid C.31' (Figure 2), the positive pole whereof is connected with an extension of the wire o', already traced, which is closed at the lower bridge of the relay C.29', and contact 42 at disk 40⁵ (Figure 5) of the transmitter 40 (Figure 1). The solenoid C.31' (Figure 2) so energized retracts its plunger which terminates at its upper extremity in a latch 24' operative on the teeth of a disk 25' mounted on a shaft 26' in common with an arm 27', corresponding in the present specification to the hundreds order of a quotient. The arms 27", 27'" corresponding respectively, to the tens and units orders, are exactly similar in operation and construction to the arm 27'. The arm 27', according to its angular deflection, closes circuit to a series of contacts 29⁰–29⁹ (Figures 2, 17) placed in circular position relatively to the axis of the arm 27'.

In normal position the quotient arm 27' (Figures 2, 17) closes circuit on the contact 29⁰. Depression of the push-button P.3 transmits current to the relay C.30, which retracts its plunger and energizes the solenoid C.31'. The solenoid C.31' retracts its plunger and rotates the arm 27' a single step, into position where it closes circuit at the contact 29', signalizing a first possible subtraction of the divisor from the dividend, at its hundreds order and a unit in the hundreds order of the quotient. As the wheel 76 (Figure 1) revolving, closes at the beginning of each subsequent subtraction, circuit through the wire g, at successive conductors 86 (Figure 3), the arm 27' (Figure 2) is progressively advanced by the solenoid C.31' at the contacts 29⁰–29⁹ (Figure 17), until the remainder at the upper order is reduced to less than the divisor and the transmitter 40 (Figure 1) shifts the operation to lower decimal orders, as hereinbefore explained. When circuits are so shifted by the transmitter 40 (Figure 1) circuit to the solenoid C.31' through the wire o' is broken at the contact 42 (Figure 5) and is closed by the contact 42, through the wire o" to the relay C.29" (Figure 2) and over the lower bridge thereof to the solenoid C.31", which in manner similar to that of the solenoid C.31', operates upon the arm 27", causing the arm 27" to close progressively on the contacts 30⁰–30⁹, corresponding to numerals of the quotient in the order of the tens. If, when circuits be so shifted, the remainder still be less than the divisor, and accordingly, no current flows through the comparator (Figure 13) to the relay C.10; the circuit of the wire u remains open at the bridge 96 (Figure 1) to the relay C.30 (Figure 2) and thence to the solenoid C.31". The arm 27", will remain, therefore, closed on the contact 30⁰, reflecting a zero in the quotient. The next shift of circuits by the transmitter 40 (Figure 1) breaks, at the disk 40⁵ circuit through the contact 42 (Figure 5) over the wire o" to the relays C.29", C.31", and closes circuit through the wire o'" to the relay C.29'" and solenoid C.31'". The solenoid C.31'" develops, in manner similar to that of the solenoids C.31', C.31" the numeral of the quotient in the units order, by advancing the arm 27'" progressively at the contacts 31⁰–31⁹. The wires leading from contacts 29⁰–29⁹ at the quotient arm 27' are shown as carried in the cable Pff (Figure 17). Wires extend from similar contacts at the respective quotient arms 27", 27'" (Figure 2); and are carried in similar cables. The wires on which circuit be so closed correspond to the numerals of the quotient which they may cause to be recorded by appropriate mechanism. Should it happen, at the beginning of an operation, that the divisor be greater than the higher orders of the dividend; circuit would be broken at the comparator (Figure 13) to the relay C.10. Circuit to the relay C.30 would remain open, and the depression of the push-button P.3, would operate no immediate displacement of an arm 27', 27", 27'". Shift of circuits would however, be effected, by the transmitter 40 (Figure 1) in manner hereinbefore disclosed; and the operation of division be performed at lower orders.

The positive or negative quality of the quotient is distinguished, through the action of the relays C.16, C.17, C.17' (Figure 1). The relay C.16 is in a circuit which originates at the source ZZ, and passes through the wire s⁻, contact plate 9 at the master switch 7, and the wire dn to the relay C.16, and thence through the wire s⁺ back to the source ZZ. When the divisor is positive, a negative current is closed on the wire i, by the master switch 7 (Figure 2), at the contact plate 9. When the divisor is negative, a positive current is closed by the master switch 7, on the wire i at the contact plate 12. The wire i passes over the bridges 209, 210, depressed, to a pole of the relay C.17. The other pole of the relay C.17 is connected with a wire dn', which leads from the bridge 97 fixed to the upper extremity of the relay C.11, over the bridge 211 closed at the relay C.16. When the dividend is positive, the wire d' is inactive, as heretofore explained; and the plunger of the relay C.11 is released. A negative current is then closed at the bridge 97, through the wire dn' over the bridge 211, to the relay C.17. When the dividend is negative, the wire d' is active and the plunger of the relay C.11 is retracted, closing at the bridge 97 a positive current from the source ZZ, through the wire s⁺ and the wire dn' to the relay C.17. If the dividend and the divisor are of the same quality; the relay C.17 remains inactive. If the dividend and the divisor are of different qualities a negative current flows to one pole, and a positive current flows to the opposite pole of the relay C.17, which retracts its plunger upwards; and closes at the bridge 207, a positive current from the source ZZ and the wire $s^+$ to the wire $d''$ leading to the solenoid C.64 (Figure 18).

Inasmuch as the dividend may be reduced to zero in the process of division, and eventual current to the relays C.11, C.16, C.17 fail, before the quotient be recorded; the relay C.17' (Figure 1) is provided, which operating with the relay C.17 upon a common plunger, holds this common plunger in stick if retracted at the beginning of an operation by the relay C.17. The relay C.17' is in the circuit of the wire $dn$, already traced, its positive pole being connected through the wire $s^+$ when its plunger is retracted, back to the source ZZ.

Column-shift

With view to simplicity in demonstration, division as described in earlier pages has been limited to three orders of whole numbers, and the receiving numbers in which to enter factors have been arbitrarily selected. Means now may be disclosed for extending computation into fractions, with automatic column-shift permitting the factors to be entered at receiving members of corresponding orders. Referring to Figure 19, the mechanism therein shown, since it is predicated on whole numbers and on fractions, provides for initial column-shift to denominationally higher or lower accumulator members preparatory to computation of the quotient and the eventual identification of its denominational recorded value by a decimal point.

Referring to Figure 19, the mechanism operative, in establishing the position of the decimal point and not hereinbefore described, comprises in addition to the accumulator arms $61'$, $61''$, $61'''$, corresponding to hundreds, tens and units, the accumulator arms $61^{iv}$, $61^v$, $61^{vi}$, corresponding to tenths, hundredths and thousandths; the electric button 15 at the master switch 7, which closes circuit to the bridges $223'-223^{vi}$, $224'-224^{vi}$; the relays $C.40'-C.40^{vi}$, $C.42'-C.42^x$, and the armature 40$^6$, together with electrical connections. The transmitter 40, previously shown in Figure 1, is shown in Figure 19, as modified to accommodate six accumulator arms and identified as 40$a$, in which the disk 40$a^5$ (Figure 22) is substituted for the disk 40$^5$ (Figure 5). The armature 40$^6$ (Figures 1 and 19) is active, whether six sections be coupled or only three. The elements of the calculating unit are similar in principle howsoever many denominational orders it may comprise; and further description relating to the six denominational orders now indicated, is accordingly limited to the automatic assignment of resultants to their proper columns, and their operation relatively to the position of the decimal point.

In division, the circuits of the divisor closed at the levers $1'-1^{vi}$, are switched upwards or downwards as many orders, as the order occupied by the first significant digit of the dividend be respectively superior or inferior to the column occupied by the first significant digit of the divisor. Quotients are thereby developed in their proper denominational orders, at corresponding orders of the calculating unit; assigning the decimal point thereby to its proper place.

Identification of the highest denominational order of a dividend or divisor, is accomplished by means of the wires $bx$, $cx$ (Figure 19), leading respectively to bridges at the levers $1'-1^{vi}$, and to the accumulator arms $61'-61^{vi}$, the circuits of these wires being closed at the master switch 7.

The outer extremity of the master switch 7 is provided with a button 15. When the master switch 7 is advanced to a position (÷) the button 15 is momentarily depressed closing and immediately breaking at the terminals 219, the circuit of the wire $sx^+$ leading from the source ZZ, to various members, as now shall be described.

The circuit of the wire $bx$ closed by the master switch on the wire $sx^+$ is extended over the bridges $223'-223^{vi}$, at the levers $1'-1^{vi}$ supported normally by the cams $4'-4^{vi}$. In falling, when their corresponding levers are deflected, the bridges $223'-223^{vi}$ respectively close circuit on the wires $bx'-bx^{vi}$. But only the circuit corresponding to the highest deflected lever becomes active; since the circuit of the wire $bx$ is broken to all bridges therebelow. The circuits $bx'-bx^{vi}$ so rendered active, identifies the highest order of a divisor.

The circuits of the wires $bx'-bx^{vi}$, extend to serial bridges on the plungers of the relays $C.40'-C.40^{vi}$, and are instrumental, as presently described, in measuring the number of columns at which the first digit of the divisor is separated from the first digit of the dividend, and in effecting corresponding shifts of circuits at the transmitter 40$a$.

The wire $cx$, closed at the master switch 7, leads to the bridges $224'-224^{vi}$ at the accumulator arms $61'-61^{vi}$ (Figure 19), operative in similar manner to the accumulator arms $61'$, $61''$, $61'''$, which bridges are normally supported by the cams $222'-222^{vi}$ fixed respectively to the sleeves $60'-60^{vi}$ which carry the accumulator arms $61'-61^{vi}$. Displacement of the accumulator arms $61'-61^{vi}$ from zero position, causes the bridges $224'-224^{vi}$, in falling to close circuit on the wires $cx'-cx^{vi}$, of which only the circuit closed at the highest accumulator $61'-61^{vi}$ becomes active; since circuit is there broken to all bridges therebelow. The circuit so rendered active, identifies the order occupied by the first digit of the dividend. The wires $cx'-cx^{vi}$ lead respectively to the positive poles of the relays $C.40'-C.40^{vi}$, whose negative poles are connected through the wire $sx^-$, closed at the master switch 7 over the bridge 34''' (Figures 2, 19) at the push-button P.3 back to the source ZZ. The relays $C.40'-C.40^{vi}$ are operative in closing the circuits of the wires $bx'-bx^{vi}$ to wires which effect the required shifts of the divisor by the transmitter 40$a$.

In division, circuits are shifted upwards or downwards, so as to place the divisor under the highest orders of the dividend, in order to effect subtractions, as heretofore described. Each column that the divisor is shifted, modifies, however, the value of the divisor in multiples of ten; and necessitates a corresponding shift of circuits to the quotient solenoids $C.31'-C.31^{vi}$ (Figures 2, 19) to higher or lower orders in order that the quotient may not be falsely diminished or increased.

The circuit of wires $o'-o^{vi}$, are in division shifted at the relays $C.29'-C.29^{vi}$, to the solenoids $C.31'-C.31^{vi}$, which operate the quotient arms $27'-27^{vi}$ (Figures 2 and 19) as hereinbefore described.

The wire $o$ (Figure 22) closes normally at the disk 40$a^5$ on the wire $o'''$ corresponding to the units order; and a shift of the divisor upwards any certain number of denominational orders, is accompanied by an equal shift of the $o$ circuit upwards from the units order. Conversely, a shift of the divisor downwards, if the divisor be greater than the dividend, would be accompanied by an equal denominational shift of the $o$ circuit downwards from the units order; and a fractional quotient would appear, the modified value of the divisor as so shifted being automatically compensated by the denominational shift of quotient circuits.

In division, as hereintofore explained, the highest order of the dividend is identified by the wire $cx'-cx^{vi}$ (Figure 19) closed at the accumulator arms $61'-61^{vi}$. The highest order of the divisor is identified by the $bx'-bx^{vi}$ circuit closed at the levers $1'-1^{vi}$; the wires $cx'-cx^{vi}$ closing, respectively, circuit to the positive poles of the relays $C.40'-C.40^{vi}$. The highest wire $cx'-cx^{vi}$ closed at the accumulator arms $61'-61^{vi}$ determines which of the relays $C.40'-C.40^{vi}$ shall be active. The circuit of the wires $bx'-bx^{vi}$ extend horizontally at different levels, over bridges carried by the plungers of the relays $C.40'-C.40^{vi}$, at which bridges the wires $bx'-bx^{vi}$ are selectively switched to extensions of the wires $dx'-dx^{10}$ leading respectively to the relays $C.42'-C.42^{x}$, at which as above described, circuit is closed on the wires $ex'-ex^{10}$ to the conductors $226'-226^{10}$ (Figures 19, 20) and the clutch $C.26$.

Since the relay $C.40'-C.40^{vi}$ which is energized, reflects the denominational order in which falls the highest digit of the dividend; and the wire $bx'-bx^{vi}$ which is active, reflects the denominational order in which the highest digit of the divisor falls; the circuit closed at the several bridges at the relays $C.40'-C.40^{vi}$, may be so wired as to correspond to the number of denominational orders, upwards or downwards, which any certain divisor shall be shifted, to place the first digit of the divisor under the highest denominational order of the dividend.

The extension of the wire $dx'$, for example, leading in a diagonally downward direction from its terminal at the next to the highest bridge of the relay $C.40'$ to its terminal at the lowest bridge on the plunger of the relay $C.40^{v}$, corresponds to an excess of one denominational order in the dividend over the number of orders in the divisor, and, accordingly, to a required one order upwards shift of the divisor. An excess of one order in the dividend occurs, when the wire $cx'$ is active with the wire $bx''$; the wire $cx''$ with the wire $bx'''$; $cx'''$ with $bx^{iv}$; $cx^{iv}$ with $bx^{v}$, or $cx^{v}$ with $bx^{vi}$.

In similar manner the extension of the wire $dx^{6}$ diagonally downwards from the highest bridge at the relay $C.40''$ to the lowest bridge at the relay $C.40^{vi}$, corresponds to an excess of one denominational order on the divisor, and to one order required downward shift thereof. Such a downward shift of one order occurs, when the wire $cx''$ is active with the wire $bx'$; $cx'''$ with $bx''$; $cx^{iv}$ with $bx'''$; $cx^{v}$ with $bx^{iv}$; or $cx^{vi}$ with $bx^{v}$.

In similar manner the diagonal extensions of the wires $dx^{2}$, $dx^{3}$, $dx^{4}$, $dx^{5}$ correspond respectively to a two, three, four and five order excess, in the denominational order of the dividend, and a required two, three, four or five order upward shift of the divisor; whereas the diagonal extensions of the wires $dx^{7}$, $dx^{8}$, $dx^{9}$, $dx^{10}$, correspond, respectively, to a two, three, four and five order excess in the denominational orders of the divisor, and a required two, three, four or five order shift of the divisor downwards.

At the bridges, beginning with the highest bridge at the relay $C.40'$, and descending diagonally to a possible lowest bridge not shown, at the plunger of the relay $C.40^{vi}$, no wire is extended, since the bridges along this diagonal pathway correspond to an equal number of orders in the dividend and the divisor, and no shift of the divisor is required. If the operation were, for example, $600 \div 200 = 3$, the wire $bx'$ corresponding to the hundreds order, would be closed at the lever $1'$ (Figure 20); and the wire $cx'$ corresponding to the hundreds order of the accumulator would be closed at the accumulator arm $61'$. The relay $C.40'$ would be energized, breaking at its highest bridge the circuit of the wire $bx'$ over the highest bridges at the relays $C.40'-C.40^{vi}$, closing on no other wire. The disk $40a^{5}$ (Figure 22) remains in normal position with the wire $o$ closing circuit on the wire $o'''$ to the relay $C.29'''$ and solenoid $C.31'''$ (Figures 2, 19); and the numeral 3 is developed in the units order of the quotient.

If the operation were $400 \div 2$; the wire $cx'$ (Figure 19) would be closed at the accumulator arm $61'$, and the wire $bx'''$ at the lever $1'''$. The relay $C.40'$, energized by the wire $cx'$ would close at its bridge second below the highest, circuit of the wire $bx'''$ on the extension of the wire $dx^{2}$, which leads to the relay $C.42^{2}$, by which current is closed on the wire $ex^{2}$ to the conductor $226^{2}$ (Figure 20). The arc of the conductor $226^{2}$ is shown in Figure 20 as of $300°$; and closes circuit through the contact $227$ (Figures 19, 20) common to all conductors $226^{1}-226^{10}$, to the relay $C.26$, which operates the transmitter in degree proportionate to the amplitude of the conductor $226^{1}-226^{10}$ to which an $ex$ circuit may be closed, to effect, in present computation, such angular displacement of the disk $40a'$ (Figure 21) as to shift the $c'''$ and the $e'''$ circuits of the divisor upwards from relays $C.4'''$, $C.2'''$ of the units order, to the corresponding relays of the hundreds order. A corresponding displacement of the disk $40a^{5}$ (Figure 22) shifts the current of the wire $o'$, to the relay $C.29'$, and solenoid $C.31'$ which said solenoid $C.31'$ operates the quotient-arm $27'$ of the hundreds order. The quotient 2, followed by two cyphers, would be reflected at the hundreds order of the quotient arm.

If the operation were $.6 \div 200 = .003$, the wire $cx^{iv}$ (Figure 19) would be closed at the accumulator arm $61^{iv}$ to the relay $C.40^{iv}$; and the wire $bx'$ leading from the lever $1'$ would be closed over the highest bridge at the relay $C.40^{iv}$ through the wire $dx^{8}$ to the relay $C.42^{8}$, where circuit would be completed through the wire $ex^{8}$ and the conductor $226^{8}$, to the clutch $C.26$. The arc of the conductor $226^{8}$ (Figure 20) is such as to cause the clutch $C.26$ (Figure 19) to rotate the transmitter $40a$ three denominational orders downwards carrying the first numeral 2, of the divisor 200 to the tenths order of the dividend, and switching the circuit of the wire $o$ three orders downwards from the units order, and closing it on the wire $o^{vi}$ to the relays $C.29^{vi}$, and solenoid $C.31^{vi}$, which solenoid $C.31^{vi}$ operates in the thousandths order. The numeral 3 preceded by two cyphers and the decimal point, would be reflected at the quotient arms.

If after shift of circuits, as above described, the quantity in the highest denominational orders of the dividend, be less than the divisor; the comparator (Figures 13, 14) automatically shifts the operation to lower orders, in manner hereinbefore disclosed.

Depression of the push button $P.3$, initiating, after shift of circuits, the operation of division, breaks the circuit of the wire $sx^{-}$, to the clutch $C.26$ and relays $C.42^{1}-C.42^{10}$; at the bridge $34'''$.

It is, as hereinbefore described, a function of the conductor 43 (Figure 22) to operate in restoring the transmitter 40a to normal position. To prevent premature action by the conductor 43, the circuit leading from the terminals 44 to the clutch C.26 is broken by the relay C.67 until computation be completed. The relay C.67 is in a circuit which originates at the source ZZ (Figure 19) and passes through the wire $s^+$, contact-plate 12, wire o, conductor 41 (Figure 22), wire y, relay C.67, and the wire $s^-$, closed at the contact plate 9 back to the source ZZ. The last shift of circuits, in operation of division, as a conductor 88 (Figure 3) closes circuit, as hereintofore described, to the clutch C.26, carries the conductor 41 beyond the terminal of the wire o, and closes circuit from the conductor 43 to the terminals 44. The relay C.67 releasing its plunger completes circuit to the clutch C.26, and the arc of the conductor 43 is such that circuit to the clutch C.26 is maintained until the position of the transmitter 40a is restored to normal.

*Restoration of the calculating unit to zero position*

Depression of the push button P.5 (Figure 2) closes a circuit which originates at the source ZZ (Figure 1) and passes through the wire $s^+$ (Figures 1, 2), the bridge at the push button P.5 (Figures 2, 7), the wire n to the relay C.19 (Figures 1, 7), best shown in Figure 7, and over the upper bridge on the plunger thereof, to the relay C.20, circuit being closed from the negative poles of the relays both C.19, C.20 through the wire $s^-$, back to the source ZZ. The relay C.19 so energized, retracts its plunger; and, when completing circuit at its upper bridge to the relay C.20; closes at its lower bridge circuit to the negative pole of the relay C.12', and to terminals at the plunger of the relay C.12'. The relay C.20 breaks, at the bridge 167, circuits through the wire h (Figure 1) to prevent interference of circuit with the wire n; and closes at the bridge 168 (Figure 7) circuit to the positive pole of the clutch C.6, fixed to the shaft 58. At the bridge 167, circuit is closed to terminals at the plunger of the relay C.12', through the wire n'.

The relay C.12' determines direction of motion at the shafts 58, 58a, during restoration of the calculating unit to zero position. The positive pole of the relay C.12' is connected with the wire d'. If, when restoration to zero position be initiated, a positive quantity be accumulated at the shaft 58, circuit of the wire d' is open at the conductor 90 (Figure 8); the relay C.12' (Figure 7) closes at the bridges 105, 106, depressed, circuit through the wires $n^-$, n', to the negative and positive poles of the clutch C.5a, and motion of the shaft 58 is opposite to clockwise. If a quantity accumulated at the shaft 58 be negative; the wire d' is active as hereinbefore described, and energizes over the bridges 92⁴, 104, the relay C.12', which is then held in stick over the bridge 104 by current through the wire n'. The relay C.12' so energized, closes at the bridges 105, 106 raised, circuit to the clutch C.5; and clockwise motion follows at the shaft 58.

Responsive to the clutch C.6, and floating on the shaft 58, is the armature 69 (Figures 1, 7, 16) which carries a conductor 172, extending, except at a slight arc, throughout the circumference of the disk. Momentary depression of the push button P.5 (Figure 2) imparts initial impulse to the clutch C.5 or C.5a and C.6. The clutch C.5 or C.5a revolving, transmits motion to the shafts 58, 58a; and the clutch C.6 clutching and revolving the disk 69 causes the conductor 172 (Figure 16) to close a circuit from the wire $s^+$ extended from the source ZZ, which holds the relays C.19, C.20 in stick, and sustains current to the clutches C.5 or C.5a and C.6, after the initial impulse imparted through the push button P.5. The conductor 172 (Figure 12) is of such arc as to sustain current throughout a single revolution of the shaft 58, this being sufficient to restore to zero position, the members of the calculating unit.

The clutches C.7, C.7'', C.7''', C.7a', C.7a'', C.7a''' (Figures 1, 7) are active, in restoring to zero position the accumulator arms 61', 61'', 61''', and such other members at the shafts 58, 58a, as may be displaced. The clutches C.7', C.7'', C.7''' are energized to restore members on shaft 58, by circuits of the wire n which pass respectively, over the bridges 171, 170, 169 at the relay C.20 (Figure 1) and conductors 173', 173'', 173''', circuits being completed from the negative poles of the relays C.7', C.7'', C.7''' through the wires $s^-$ back to the source ZZ. The conductor 173' (Figure 1) is carried by the middle member of the planetary gearing df'. The conductor 173'' is carried by the middle member of the planetary gearing df''; and the conductor 173''' is carried by the member 62'''. The operation at all orders is substantially alike. Referring to Figures 1, 15, the conductor 173''', for example, extends throughout the circumference of the member 62''', except at a slight arc, at which, if the member 62''' and the accumulator arm 61''' be already at zero position, circuit is open to the clutch C.7''' (Figure 1). If the accumulator arm 61''' and the member 63''' be displaced; circuit is completed through the conductor 173''' to the clutch C.7''', which clutching, in manner hereinbefore described, the member 62'', transmits motion to the member 62''', until circuit to the clutch C.7''' is broken at the conductor 173''', as the accumulator arm 61''' and the member 62''' reach zero. The accumulator arms 61'', 61' are restored to zero position, by circuits similarly closed and broken, leading to the clutches C.7'', C.7' (Figure 1). The members carried by the shaft 58a may be restored to zero position in similar manner, by extensions of the wire n leading respectively from the bridge 169a at the relay C.20 shown in entirety in Figure 7, to the clutch C.7a''', from the bridge 170a to the clutch C.7a''; and from the bridge 171a to the clutch C.7a'. Conductors similar to the conductor 173''' (Figure 15) are carried by the disk 62a''', and by the middle members of the planetary gearings dfa'', dfa', which break circuit respectively to clutches C.7a''', C.7a'', C.7a', as the sleeves 60a''', 60a'', 60a' reach zero position.

During restoration to zero, circuit to the clutches C.8'', C.8''', C.8a'', C.8a''', through the wire $ds^-$ is broken at the lower bridge at the relay C.19, and the carry-over mechanism is inactive, except as to the clutch C.8a' whose negative pole is connected with the wire $s^-$, and which restores to normal position the armature 63a'.

The quotient arms 27'—27'' may manually or otherwise be cleared by the release of springs not shown.

Having now fully described my invention and its manner of operation, I claim:

1. In a calculating apparatus for dividing one by the other quantities whether positive or negative in quality, an accumulator comprising denominational members operative in respective opposite directions to accumulate a positive or negative dividend, denominational members in which to enter a divisor for dividing an accumulated dividend, members to reflect the numerals of the quotient, a relay, a circuit controller comprising denominational members operative coincidentally in coordinated directions with the accumulator members and provided with transfer mechanism operative at first step phases in either direction, a circuit closed or broken by the circuit controller at its denominationally highest member to actuate or immobilize the relay accordingly as an accumulated dividend be negative or positive, a supplemental relay, a circuit to last said relay, a wire of last said circuit differentially polarized by first said relay accordingly as the quality of the dividend be positive or negative, a state control differentially adjustable according to the quality of the divisor, a wire to said supplemental relay differentially polarized by the state control accordingly as the divisor be positive or negative in quality for energizing or immobilizing the supplemental relay accordingly as the polarization of said wires be similar or dissimilar in quality, to identify the quality of the quotient as positive or negative in quality accordingly as last said relay be immobilized or energized.

2. In a calculating apparatus, an accumulator comprising denominational members for accumulating a dividend, denominational receiving members in which to enter a divisor to divide an accumulated dividend, denominational clutches, circuits to the clutches, a motor to operate the clutches, means including denominational actuating relays and denominational actuating circuits to the relays closed by the receiving members for completing the circuits to the clutches to operate the accumulator members, immobilizing relays, immobilizing circuits corresponding to the numerals of the divisor selectively closed by the receiving members, a timing member synchronized with the accumulator members for closing the last said circuits to the immobilizing relays and cause the last said relays to break circuit to the actuating relays to deenergize the clutches and arrest the accumulator members when operated in degree corresponding to the numerals of the divisor, and column shift mechanism, the said mechanism comprising denominational identifying circuits, a said denominational identifying circuit controlled by the accumulator member corresponding to the order of the highest significant numeral of the dividend, a said denominational identifying circuit controlled by the receiving members corresponding to the order of the highest significant digit of the divisor, a transmitter provided with switch elements, a clutch to operate the transmitter, a relay controlled by the identifying circuit corresponding to one factor to close the circuit corresponding to the other factor to close circuit to last said clutch and cause the transmitter to shift the said actuating circuits and said immobilizing circuits corresponding to the numerals of the divisor denominationally upwards or downwards into connection with the actuating relays and the immobilizing relays corresponding to the orders of the accumulator which correspond to the significant orders of the dividend.

3. In a calculating apparatus for dividing one by the other quantities whether positive or negative, an accumulator comprising denominational members angularly displaceable in respective positive or negative direction to accumulate a positive or negative dividend, denominational clutches to operate the members, driving means including reversible transmission to operate the clutches, means including a directional relay to control the reversible transmission, a circuit controller comprising denominational members operative coincidentally in coordinated directions with the accumulator members and provided with transfer mechanism operative at first step transfer phases in either direction, and a circuit differentially conditioned by the controller at its denominationally highest member according to the quality of an accumulated dividend, to condition the directional relay automatically to reverse the said transmission to divide an accumulated dividend by a divisor.

4. In a calculating apparatus for division an accumulator comprising denominational members displaceable in respective opposite direction, to accumulate a positive or negative dividend, reversible driving means to operate the members, means including a directional relay to control the driving means and determine the direction of displacement, means including a circuit differentially conditioned accordingly as the dividend be negative or positive to energize or immobilize the directional relay, denominational members to reflect the numerals of a quotient, a state control, a supplemental relay, a circuit to the last said relay, a wire of last said circuit differentially polarized by the directional relay according to the quality of the dividend, and a wire of last said circuit differentially polarized by the state control according to the quality of the divisor, for energizing or immobilizing the supplemental relay accordingly as the polarization of the wires be dissimilar or similar in quality, automatically to forecast at the inception of division the quality of the quotient as positive or negative accordingly as the supplemental relay be immobilized or energized.

5. In a calculating apparatus for dividing one by the other quantities whether positive or negative, an accumulator comprising denominational members displaceable in respective positive or negative direction to accumulate a positive or negative dividend, driving means including reversible transmission to operate said members, means including a directional relay to control the said transmission, a circuit controller operative coincidentally in coordinated directions with the accumulator members, means including a circuit differentially conditioned by the controller to actuate or immobilize the directional relay accordingly as the dividend be negative or positive, denominational members to reflect the numerals of a quotient, a state control, a supplemental relay, a circuit to last said relay, a wire of last said circuit differentially polarized by the directional relay according to the quality of the dividend, a wire of last said circuit differentially polarized by the state control according to the quality of the divisor, for energizing or immobilizing the supplemental relay accordingly as the polarization of said wires be dissimilar or similar in quality to identify the quotient as positive or negative in quality accordingly as last said relay be immobilized or energized.

6. In a calculating apparatus for division, an accumulator comprising denominational members to accumulate a dividend, means including denominational clutches to operate the members, means including denominational actuating circuits corresponding to a divisor to energize the clutches, means including immobilizing circuits corresponding to the numerals of the divisor to break said actuating circuits and arrest the accumulator members when operated in degree proportionate to said numerals, electrical driving means to operate the clutches, means including a relay differentially conditioned to energize or immobilize the driving means accordingly as the dividend or a remainder be divisible or indivisible by the divisor, a transmitter provided with switch elements, a clutch to operate the transmitter, a circuit to the last said clutch, means including a conductor synchronized with the accumulator members to close a wire of last said circuit after each partial operation of division, a wire of last said circuit closed by the said relay if the dividend or a remainder be indivisible by the divisor to complete the last said circuit and cause the transmitter to shift the said actuating and immobilizing circuits into cooperative connection with the denominational clutches corresponding to the next lower orders of the dividend.

7. In a calculating apparatus for division, an accumulator comprising denominational members to accumulate a positive or negative dividend, electrically actuated driving means to operate the members, denominational receiving members displaceable in steps corresponding to ascending numerals in which to enter a divisor, and means quantitatively to compare the factors, the last said means comprising a comparator relay, denominational comparator circuits corresponding to the numerals of the dividend and terminals stepped in series contiguous to each receiving member, means including a relay differentially to connect said circuits in serially transposed order with said terminals accordingly as the dividend be positive or negative, a conductor and an auxiliary conductor controlled by each receiving member, means including a said conductor operative by the receiving member corresponding to the initial order of the divisor to close the comparator circuit corresponding to the initial numeral of the dividend or a remainder directly to the comparator relay to energize the driving means, if the terminal of last said circuit be superior in step to the displacement of the last said receiving member, means to throw the last said relay into open circuit if said displacement be superior in step to last said terminal, and means including a said auxiliary conductor to close the last said circuit to the comparator circuit of next lower denomination for similar comparison at the receiving members of progressively lower order, if the last said terminal and said displacement be of equal step.

8. In a calculating apparatus for division, an accumulator comprising denominational members to accumulate a positive or negative dividend, electrically actuated driving means to operate the members, denominational receiving members displaceable in steps corresponding to ascending numerals in which to enter a divisor, and means quantitatively to compare the factors, the last said means comprising a comparator relay, denominational comparator circuits corresponding to the numerals of the dividend and terminals stepped in series contiguous to each receiving member, means including a relay differentially to connect said circuits in serially transposed order with said terminals accordingly as the dividend be positive or negative, a conductor and an auxiliary conductor controlled by each receiving member, means including a said conductor operative by the receiving member corresponding to the initial order of the divisor to close the comparator circuit corresponding to the initial numeral of the dividend or a remainder directly to the comparator relay to energize the driving means, if the terminal of last said circuit be superior in step to the displacement of the last said receiving member, means to throw the last said relay into open circuit if said displacement be superior in step to last said terminal, and means including a said auxiliary conductor to close the last said circuit to the comparator circuit of next lower denomination for similar comparison at the receiving members of progressively lower order, if the last said terminal and said displacement be of equal step, a transmitter provided with switch elements, a clutch to operate the transmitter, a circuit to last said clutch, a conductor synchronized with the accumulator members to close a wire of last said circuit and a wire of last said circuit closed by the comparator relay when in open circuit to complete the last said circuit and cause the transmitter to shift the said actuating and immobilizing circuits into cooperative connection with the accumulator members of next lower orders, and means including an auxiliary relay for sustaining circuit to the comparator relay, if there be latent at the accumulator unexhausted remainder of order higher than the orders so compared, to sustain the comparator relays and immobilize the transmitter until the remainder of said higher order be exhausted.

9. In a calculating apparatus for division, an accumulator comprising denominational members to accumulate a dividend, means including denominational clutches to operate the members, means including denominational actuating circuits corresponding to a divisor to energize the clutches, means including immobilizing circuits corresponding to the numerals of the divisor to break said actuating circuits and arrest the accumulator members when operated in degree proportionate to said numerals, electrical driving means to operate the clutches, means including a relay differentially conditioned to energize or immobilize the driving means accordingly as the dividend or a remainder be divisible or indivisible by the divisor, a transmitter provided with switch elements, a clutch to operate the transmitter, a circuit to the last said clutch, means including a conductor synchronized with the accumulator members to close a wire of last said circuit after each partial operation of division and a wire of last said circuit closed by the said relay if the dividend or a remainder be indivisible by the divisor, to complete the last said circuit and cause the transmitter to shift the said actuating and immobilizing circuits into cooperative connection with the denominational clutches corresponding to the next lower orders of the dividend; and means including an auxiliary relay for sustaining circuits to the comparator relay, if there be latent at the accumulator an unexhausted remainder of order higher than the orders so compared, to actuate the driving means until last said remainder be exhausted.

HENRY JEWETT FURBER.